United States Patent
Ikeda et al.

(10) Patent No.: US 7,660,511 B2
(45) Date of Patent: Feb. 9, 2010

(54) RECORDING MEDIUM, PLAYBACK DEVICE, RECORDING METHOD, PLAYBACK PROGRAM, AND PLAYBACK METHOD DESIGNATING CUE-UP POSITION USING PLAYLIST MARK INFORMATION

(75) Inventors: Wataru Ikeda, Osaka (JP); Tomoyuki Okada, Nara (JP); Yasushi Uesaka, Sanda (JP)

(73) Assignee: Panasonic Corporation, Osaka (JP)

( * ) Notice: Subject to any disclaimer, the term of this patent is extended or adjusted under 35 U.S.C. 154(b) by 718 days.

(21) Appl. No.: 10/554,147

(22) PCT Filed: Apr. 15, 2004

(86) PCT No.: PCT/JP2004/005366
§ 371 (c)(1),
(2), (4) Date: Jul. 31, 2006

(87) PCT Pub. No.: WO2004/095455
PCT Pub. Date: Nov. 4, 2004

(65) Prior Publication Data
US 2007/0003219 A1    Jan. 4, 2007

(30) Foreign Application Priority Data
Apr. 23, 2003  (JP) .............................. 2003-118284

(51) Int. Cl.
*H04N 5/76* (2006.01)
(52) U.S. Cl. .......................................... 386/68; 386/83
(58) Field of Classification Search ......... 386/124–126, 386/83, 95, 68
See application file for complete search history.

(56) References Cited

U.S. PATENT DOCUMENTS

| 6,085,021 | A | * | 7/2000 | Tozaki et al. ................. 386/68 |
| 7,236,687 | B2 | | 6/2007 | Kato et al. |
| 7,477,833 | B2 | | 1/2009 | Kato et al. |
| 2003/0103604 | A1 | | 6/2003 | Kato et al. |
| 2007/0286577 | A1 | | 12/2007 | Kato et al. |

FOREIGN PATENT DOCUMENTS

| EP | 1 043 724 B1 | 9/2000 |
| JP | 09-251761 | 9/1997 |
| JP | 11-41563 | 2/1999 |
| JP | P3128220 | 11/2000 |
| JP | 2002-159004 | 5/2002 |

* cited by examiner

*Primary Examiner*—David E Harvey
(74) *Attorney, Agent, or Firm*—Panasonic Patent Center; Dhiren Odedra; Kerry Culpepper

(57) ABSTRACT

An AVClip, and a PLMark specifying a playback start position in the AVCLip, are recorded on a BD-ROM. A cue-up operation for choosing a playback start position in the AVClip is performed by three types of instructions, namely a user-skip operation, a chapter search operation, and a Link command.

Among these three types of instructions, attribute information included in marker information indicates whether only a branching command operation is allowed for choosing a corresponding playback start position, or the user-skip operation and the chapter search operation are allowed adding to the branching command.

8 Claims, 26 Drawing Sheets

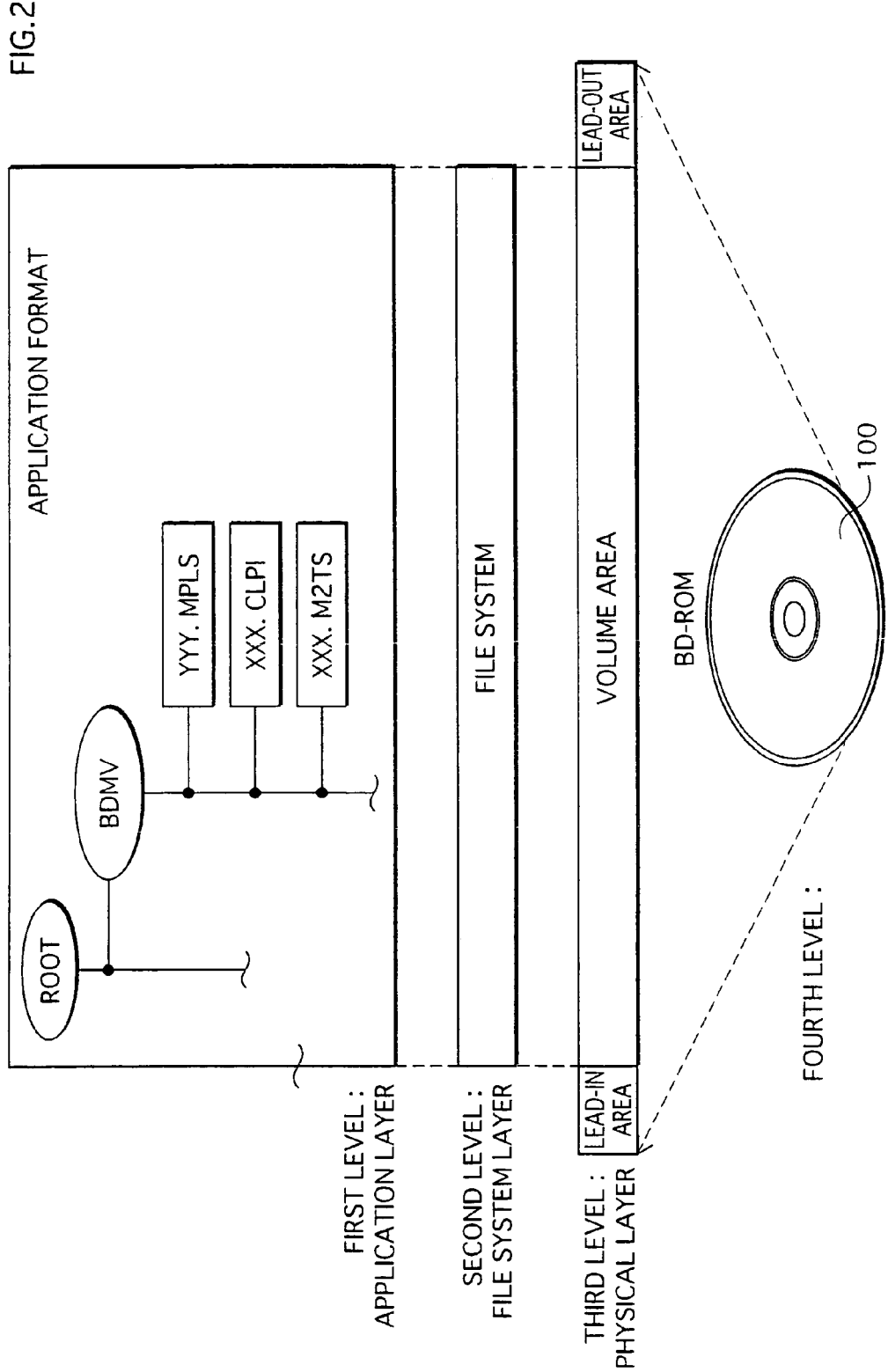

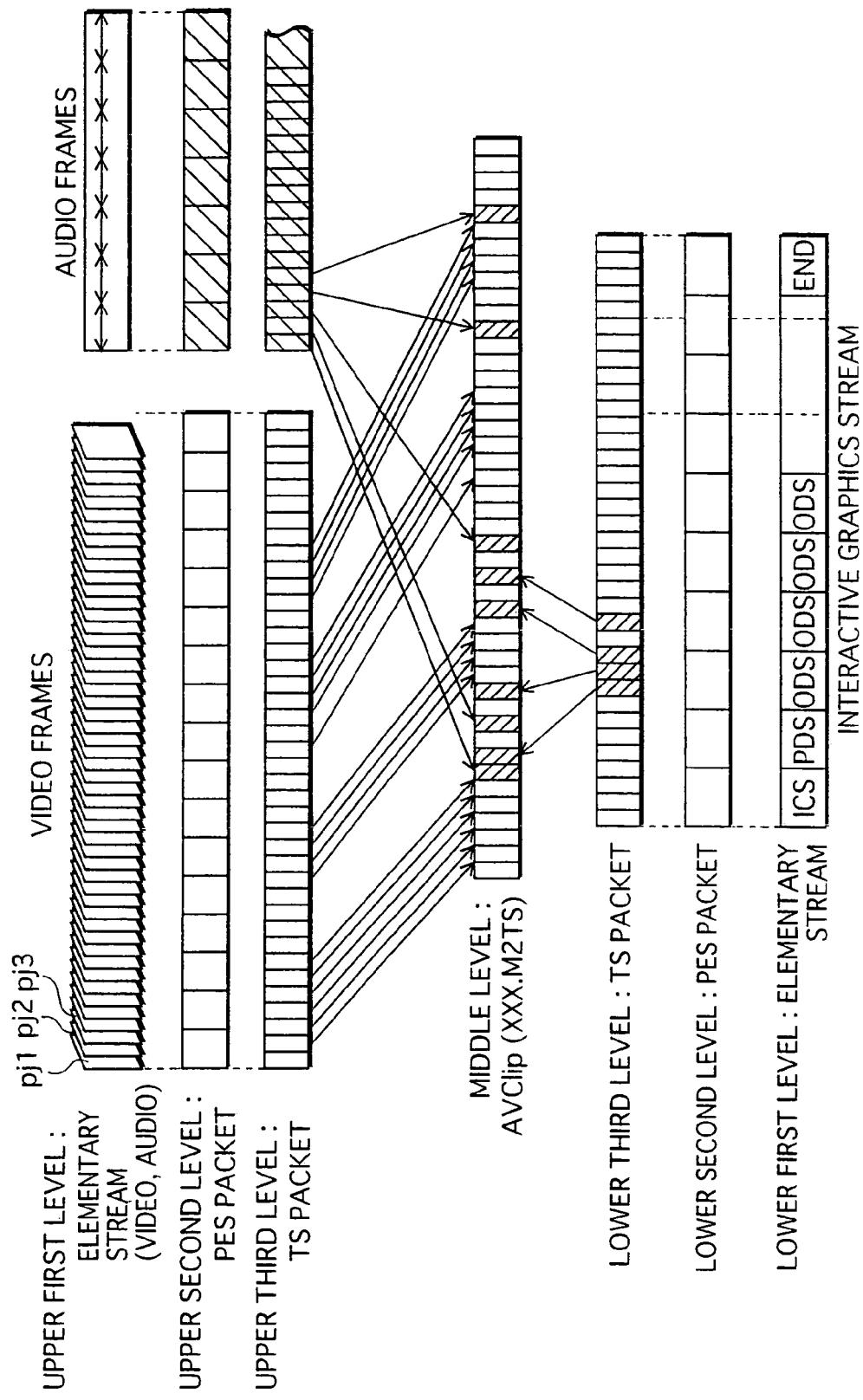

RECORDING MEDIUM, PLAYBACK DEVICE, RECORDING METHOD, PLAYBACK PROGRAM, AND PLAYBACK METHOD DESIGNATING CUE-UP POSITION USING PLAYLIST MARK INFORMATION

CROSS-REFERENCE TO RELATED APPLICATIONS

This is a National Stage of International Application No. PCT/JP04/05366, filed Apr. 15, 2004.

TECHNICAL FIELD

The present invention relates to a recording medium on which a digital stream is recorded and a playback device for playing such a recording medium, and in particular to improving the way in which playback jumps to any predetermined positions in a digital stream.

BACKGROUND ART

Contents distributed via read-only recording media such as BD-ROMs can be classified in genres such as AV (Audio-Video) software including movie and music, and game software. However, with the sophistication of recent playback devices, some contents classified in the genre of AV software have an interactive function which game software generally has.

The interactive function is realized by incorporating information for the interactive function into a digital stream, which is constituted of moving picture portions and audio portions of the AV software. With this interactive function, it becomes possible to play a question video with use of the digital stream, receive an answer for the question from a user, and play an answer video when the answer from the user is correct, for instance.

However, although having such an interactive function, this type of content still belongs to the genre of AV software. Therefore, so-called user-skip is available while the content is played, just as normal AV software. The user-skip is one of functions specific to AV equipment (called "AV function"), which DVD playback devices and CD playback devices provide. With this function, playback can jump to predetermined positions (cue positions) on a digital stream according to instructions from the user (This jump operation is hereinafter called a "cue-up operation"). For instance, when a key allocated for the user-skip is pressed once by the user, the playback device starts playback from the first cue position that is nearest to the current playback position. When the key is pressed twice, the playback device starts playback from the second cue position that is second nearest to the current playback position, and when the key is pressed three times, the play back device starts playback from the third cue position that is third nearest to the current play back position.

For realizing the above-described interactive function, the start position of answer video is specified as a cue position by so-called marker information, and accordingly the playback process can jump from the question video to the answer video. However, the user might reach the answer video by repeating the skip operation because of this function. Basically, the answer video is designed to be played only when the user inputs the right answer for the question. If the video can be played back by repeating the skip operation, the poor operationality might give the user an impression that the content is only an extra of AV software. Of course, it is possible to set the playback device not to accept any AV function so that the user can not view the answer video by repeating the user-skip. However, this removes the advantage of AV software, and it is not recommendable for content creators.

DISCLOSURE OF THE INVENTION

The present invention aims to provide a recording medium in which an answer video can be played only at a time intended by the creator, that is when the user gets a correct answer for a question video, and can not be played with use of AV functions.

The object can be achieved by a recording medium comprising: a digital stream and marker information, said marker information specifying a predetermined position in said digital stream, wherein: said marker information includes attribute information relating to the predetermined position; and the attribute information is used to indicate whether a playback device should refer to or ignore the predetermined position when a user operation intended to choose the predetermined position as a playback start position is received.

By defining the attribute of the marker information, a playback start position (cue position) to which playback can not jump by the user skip, but can jump by the branching commands, is definable. Accordingly, it becomes possible to define the content at the time of authoring so that the user can not view the answer video no matter how many times the user performs the user skip.

Further, the creator of the contents can allow user to perform the user skip for choosing a material, a question, or the like, and at the same time, the creator can hide the answer from the user. This playback control, which is an improved playback control taking advantage of the AV functions, is of great benefit for the creator.

BRIEF DESCRIPTION OF THE DRAWINGS

FIG. 2 shows a structure of a BD-ROM;

FIG. 3 schematically shows how an AVClip is constituted;

BEST MODE FOR CARRYING OUT THE INVENTION

The First Embodiment

Figure 1A:
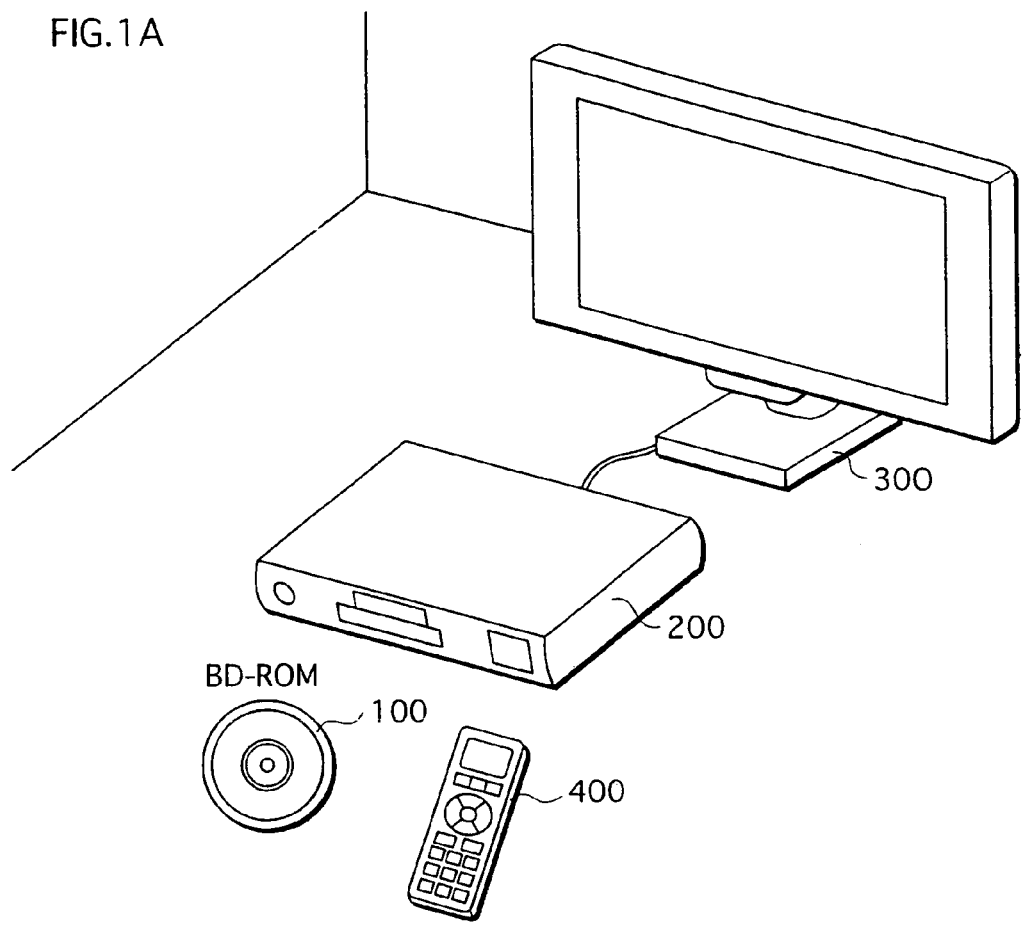
FIG. 1A shows configuration for use of a recording medium pertaining to the present invention.
Figure 1B:
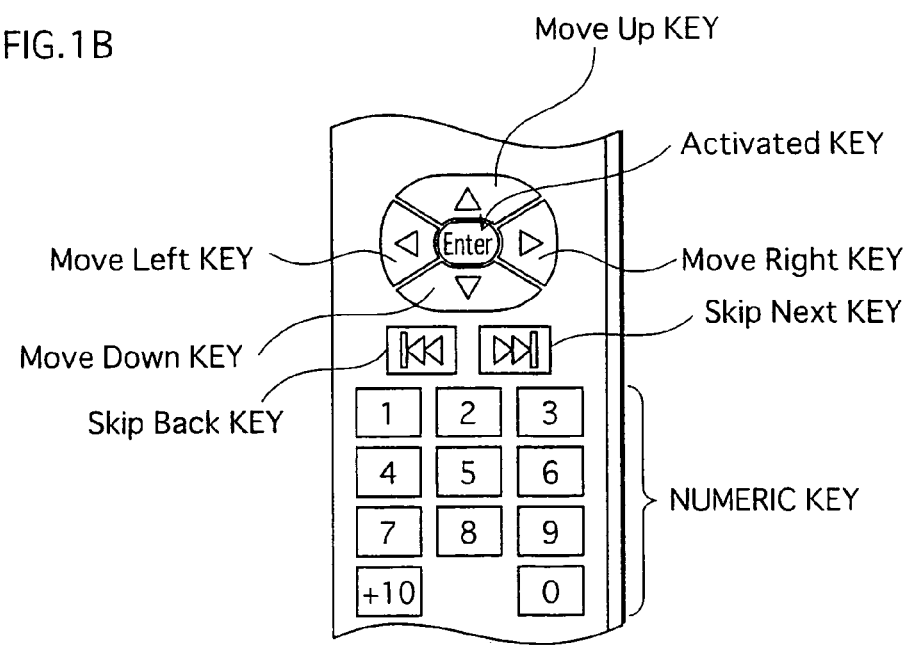
FIG. 1B shows keys of a remote controller 400 for receiving instructions from a user for operations on interactive screen.

The following describes embodiments of a recording medium pertaining to the present invention. Firstly, a usage act is described in relation to the implementation of the recording medium and the play back device pertaining to the present invention. FIG. 1A shows a usage act of a recording medium and a playback device pertaining to the present invention. In FIG. 1A, a recording medium according the present invention is a BD-ROM 100, and a playback device pertaining to the present invention is a playback device 200. The BD-ROM 100 is used to supply movie works in a home theater system formed from the playback device 200, a TV set 300, and a remote controller 400. Among these, the remote controller 400 is for receiving instructions from the user for changing the state of an interactive screen, and it is closely related to the recording medium pertaining to the present invention. FIG. 1B shows keys of the remote controller 400 for receiving instructions from the user for operations on the interactive screen. AS FIG. 1B shows, the remote controller 400 includes a Move Up key, a Move Down key, a Move Right key, a Move Left key, a Skip Back key, Skip Next key, and numeric keys "0" to "09" and "+10". Buttons displayed on the interactive screen respectively have three states, namely, a normal state, a selected state, and an active state. The Move Up key, the Move Down key, the Move Right key, and the Move Left key are for receiving instructions from the user for changing the state of the buttons from the normal state to the selected state and to the active state in this order. The normal state is a state in which a button is only displayed. On the contrary, the selected state is a state in which the button is focused on by an instruction from the user, but the selection is not confirmed. The active state is a state in which the selection is confirmed. The Move Up key is for changing the state of a button which is above a button in the selected state to the selected state on the interactive screen. The Move Down key is for changing the state of a button which is below the button in the selected state. The Move Right key is for changing the state of a button which is on the right of the selected button to the selected state. The Move Left key is for changing the state of a selected button which is on the left of a button to the selected state.

An Activated key is for activating the button in selected state and thereby changing the state to the active state.

The Skip Back key accepts a user-skip for skipping backward from a current playback position.

The Skip Next key accepts a user-skip for skipping forward from a current playback position.

The numeric keys "0" to "9" are for changing the state of a button corresponding to the inputted number to the selected state.

The "+10" key is for adding 10 to an already inputted numeric value. Note that both the "0" key and the "+10" key are for receiving numeric values having more than two digits, and therefore the remote controller may provide only one of those keys.

This concludes the description of the usage act of the recording medium pertaining to the present invention and the playback device pertaining to the present invention.

Secondly, a production act is described in relation to the implementation of a recording medium and a playback device pertaining to the present invention. A recording medium pertaining to the present invention can be implemented as a result of enhancements in the application layer of BD-ROMs. FIG. 2 shows the structure of a BD-ROM.

The fourth level in FIG. 2 shows a BD-ROM, and the third level shows a track on the BD-ROM. The track at the third level depicts, in a laterally drawn-out form, the track spiraling from the inside to the outside of the BD-ROM. The track is formed from a lead-in area, a volume area, and a lead-out area. The volume area in FIG. 2 has a layer model consisting of a physical layer, a file system layer, and an application layer. The application layer format (application format) of the BD-ROM is shown in the first level of FIG. 2 with use of a directory structure notation. As this figure shows, below a ROOT directory in the BD-ROM is a BDMV directory, and below the BDMV directory are various files, such as XXX.M2TS, XXX.CLPI, and YYY.MPLS. A recording medium pertaining to the present invention is industrially manufactured by forming such an application format shown in FIG. 2 on the application layer of a BD-ROM. When each of files, such as XXX.M2TS, XXX.CLPI, and YYY.MPLS, exists more than one, it is preferable to prepare a STREAM directory, a CLIPINF directory, and a PLAYLIST directory below the BDMV directory, and store files of which file types are same as that of the XXX.M2TS in the STREAM directory, store files of which file types are same as that of the XXX.CLPI are in the CLIPINF directory, and store of which file types are same as that of YYY.MPLS in the PLAYLIST directory.

The following is a description of the AVClip (XXX.M2TS) in the application format.

The AVClip (XXX.M2TS) is an MPEG-TS (Transport Stream) format digital stream obtained by multiplexing a video stream, one or more audio streams, a presentation graphics stream, and an interactive graphics stream. Video streams show moving picture portions of a movie, audio streams show audio portions of a movie, presentation graphics streams show subtitles of a movie, the interactive graphics streams show procedures involved in dynamic playback controls that target menus. FIG. 3 schematically shows how an AVClip is constituted.

The AVCLip (the middle level) is formed by converting a video stream comprising a plurality of video frames (pictures pj1, pj2 and pj3) and an audio stream comprising a plurality of audio frames (the upper first level) into a PES packet string (the upper second level), which is then converted into TS packets (the upper third level). Likewise, a presentation graphics stream and an interactive graphics stream (the lower first level) are converted into a PES packet string (the lower second level), which is converted to TS packets (the lower third level), and the TS packets are multiplexed.

The following is a description of the interactive graphics stream. As the lower first level of FIG. 3 shows, the interactive graphics stream includes function segments, namely, an ICS (Interactive Composition Segment), a PDS (Palette Definition Segment), an ODS (Object_Definition_Segment) and an END (END of Display Set Segment).

The "Interactive Composition Segment" is a function segment for forming an interactive screen.

The "Object_Definition_Segment" is information defining a graphics object. The following is a description of the graphics object. The advantage of an AVClip recorded on a BD-ROM is its Hi-Vision like high quality. For realizing this quality, the resolution of the graphics object is set to as high as 1920×1080 pixels. The bit lengths of index values (red color-difference (Cr Value), blue color-difference (Cb value), brightness (Y value), and transparency (T value)) per pixel are 8 bits respectively, and therefore any 256 colors of the full 16,777,216 colors are selectable as the colors for the pixel. The ODS is given an "object_id". The "object_id" is for identifying a graphics object corresponding to the ODS in Epoch on one-to-one basis. When an animation is composed by a plurality of graphics objects defined by a plurality of ODSs, "object_id"'s given to the respective ODSs have sequential numbers.

The "Palette Definition Segment" is information defining a palette for a color conversion.

The "END of Display Set Segment" indicates the transmission end of the Display Set, and is placed so as to directly follow the ODS in the Display Set including the ICS, the PDS, and the ODS in this order.

Figure 4:
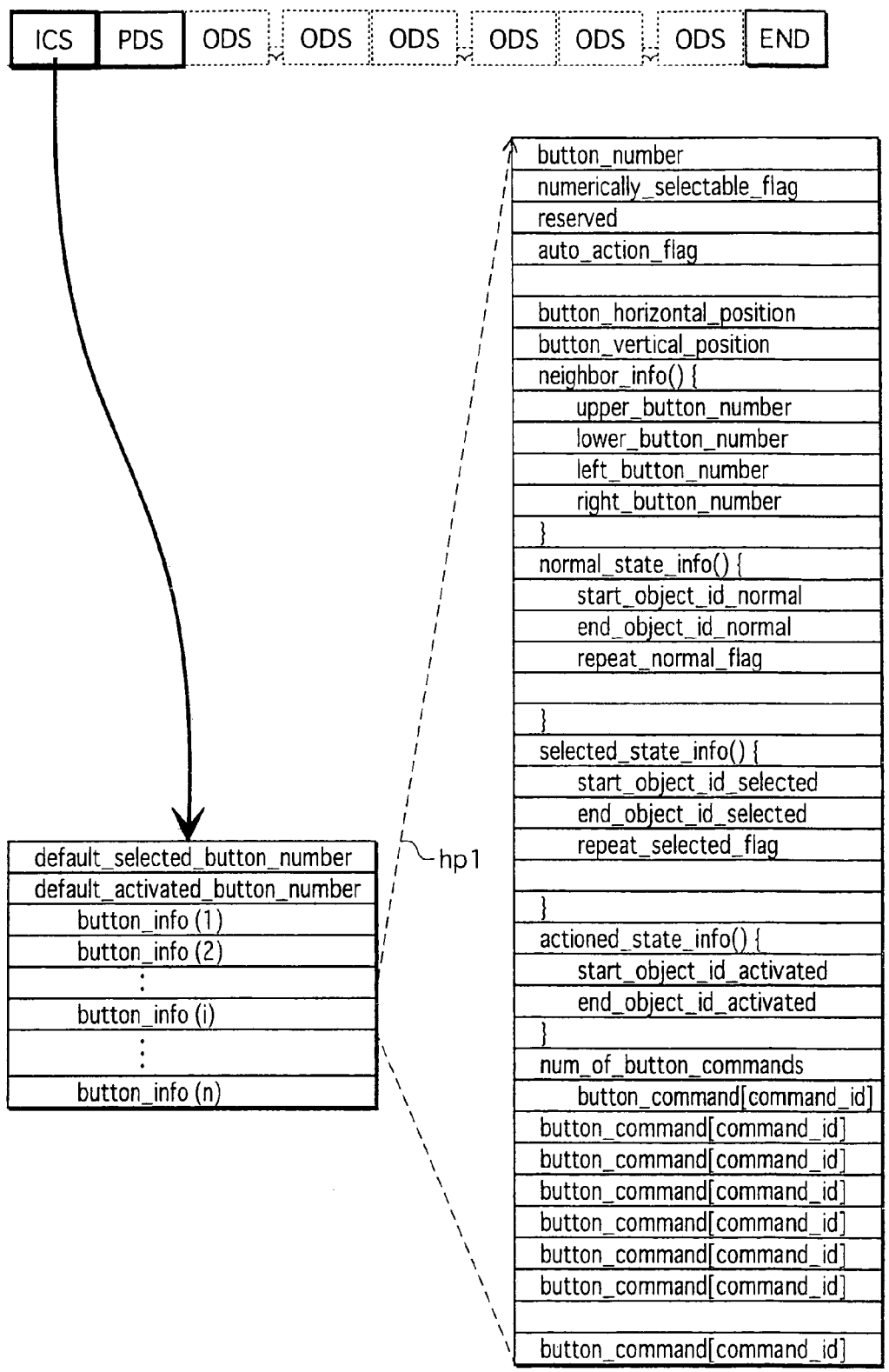
FIG. 4 shows a data structure of an Interactive Composition Segment.

The following is a description of the internal structure of the ICS. FIG. 4 shows the data structure of the Interactive Composition Segment. As this figure shows, the ICS includes "a button info group (button_info (1), (2), (3) . . . )".

The "button_info" is for defining a button in the interactive screen. With the leaders hp1 in the figure, the internal structure of the button_info (i), which is $i^{th}$ button_info controlled by the ICS, is highlighted. The following is a description of pieces of information included in the button_info (i).

The "button_number" is a value for identifying the button i on one-to-one basis.

The "numerically_selectable_flag" is a flag indicating whether or not selecting a numeric value for the button i is allowable.

The "auto_action_flag" indicates whether or not the button i changes to the active state automatically. In the case where the "auto_action flag" is on (the bit value is 1), the button i will be in the active state instead of the selected state when the button is selected. In the case where the "auto_action_flag" is off (the bit value is 0), the button i will be in the selected state as usual when the button is selected.

The "object_horizontal_position", and the "object_vertical_position" respectively indicate the horizontal position and the vertical position of the top-left pixel of the button i in the interactive screen.

In the case where the button i is in selected state, the "upper_button_number" indicates the number allocated to the button that is to be in selected state in place of the button i when the Move Up key is pressed. If the number allocated to the button i is set to the "upper_button_number", the press of the Move Up key is to be ignored.

The "lower_button_number", the "left_button_number", and the "right_button_number" indicate the numbers allocated to the buttons that are to be in selected state in place of the button i when the Move Down key, the Move Left key, and the Move Right key are pressed respectively. If the number allocated to the button i is set to those fields, the press of those keys are to be ignored.

Regarding the "start_object_id_normal", in the case where the button i in the normal state is animated, the first number of a plurality of sequential "object_IDs" given to the plurality of ODSs composing the animation is described in this "start_object_id_normal".

Regarding the "end_object_id_normal", in the case where the button i in the normal state is animated, the last number of a plurality of sequential "object_IDs" given to the plurality of ODSs composing the animation is described in this "end_object_id_normal". If the ID indicated by the "end_object_id_normal" is the same as the ID indicated by the "start_object_id_normal", the still picture of the graphics object indicated by the ID becomes the picture of the button i.

The "repeated_normal_flag" indicates whether to repeat the amnition of the button i in the normal state.

Regarding the "start_object_id_selected", in the case where the button i in the selected state is animated, the first number of a plurality of sequential "object_IDs" given to the plurality of ODSs composing the animation is described in this "start_object_id_selected".

Regarding the "end object_id_selected", in the case where the button i in the selected state is animated, the last number of a plurality of sequential "object_IDs" given to the plurality of ODSs composing the animation is described in this "end_object_id_selected". If the ID indicated by the "end_object_id_selected" is the same as the ID indicated by the "start_object_id_selected", the still picture of the graphics object indicated by the ID becomes the picture of the button i.

The "repeated_selected_flag" indicates whether to repeat the animation of the button i in the selected state. In the case where the value of the "start_object_id_selected" is the same as the value of the "end_object_id_selected", a value "00" is set to this field.

Regarding the "start_object_id_activated", in the case where the button i in the active state is animated, the first number of a plurality of sequential "object_IDs" given to the plurality of ODSs composing the animation is described in this "start_object_id_activated".

Regarding the "end_object_id_activated", in the case where the button i in the normal state is animated, the last number of a plurality of sequential "object_IDs" given to the plurality of ODSs composing the animation is described in this "end_object_id_activated".

The next is a description of button_commands.

The "button_commmands" are navigation commands which are executed when the state of the button i changes to the active state. The navigation commands are for having the playback device perform playback control, such as branching. Among the navigation commands, a command for instructing the playback device to start the playback from an indicated cue position in the AVClip, is called a Link command.

The Link command is an indirect reference command mediated by marker information, and indicates any time position on the time axis. The time position is indirectly referred by the marker information. Therefore, even if the picture at a cue position is changed by re-encoding of an AVClip, there is no need to rewrite the operand of the button_command as far as the marker information is rewritten. This saves time for rewriting navigation commands at the time of re-encoding, and this is meaningful at a time of authoring. The marker information is described in detail later.

Figure 5:
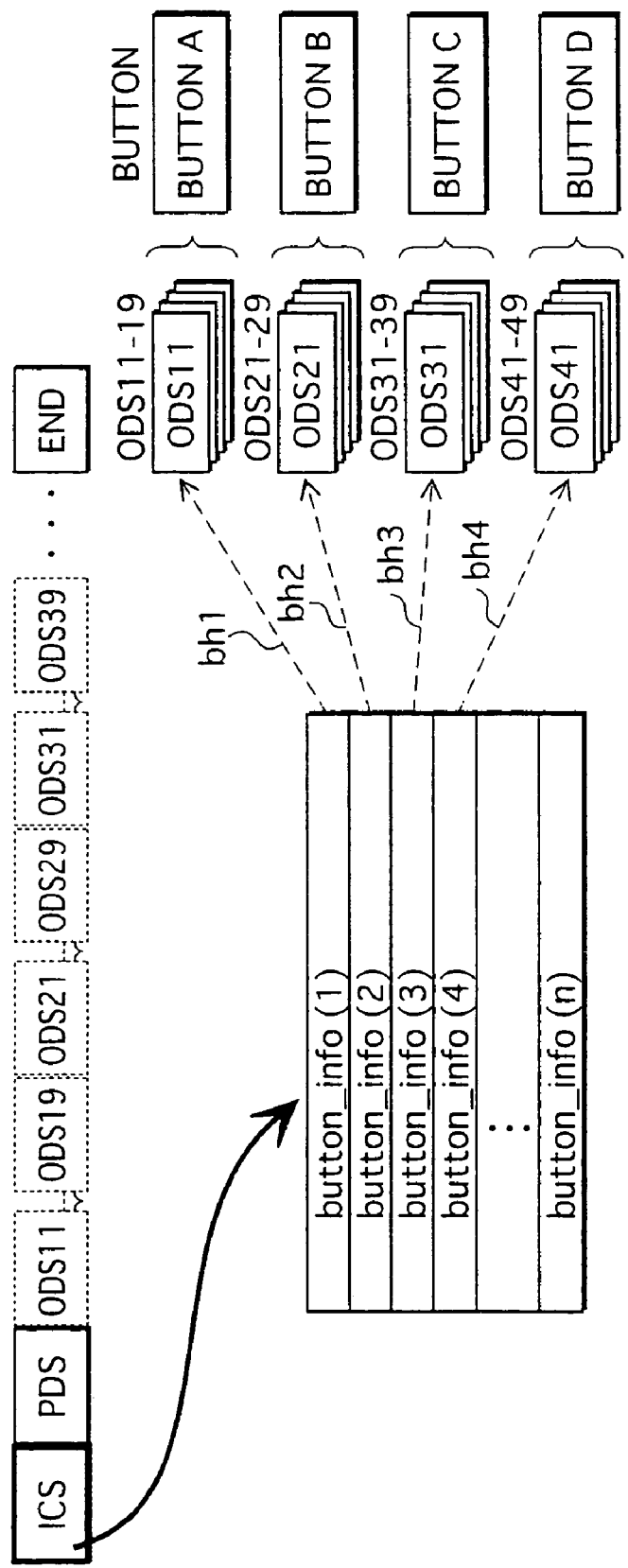
FIG. 5 shows a relation between an ODS and an ICS included in a certain DSn.

This concludes the description of the internal structure of the ICS. A specific example of the interactive control by the ICS is described next. ODSs and an ICS shown in FIG. 5 are taken as examples here. FIG. 5 shows the relation between the ODSs and the ICS included in a certain DSn. The DSn includes ODSs 11 to 19, 21 to 29, 31 to 39, and 41 to 49. Among these ODSs, the ODSs 11 to 19 describe each state of the button A, ODSs 21 to 29 describe the states of the button B, ODSs 31 to 39 describes the states of the button C, and ODSs 41 to 49 describe the states of the button D (indicated by braces "}" in the figure).

Pieces of the state control information for those buttons A to D are respectively described in the button_infos (1), (2), (3), and (4) (indicated by arrows bh1, 2, 3, and 4).

Figure 6:
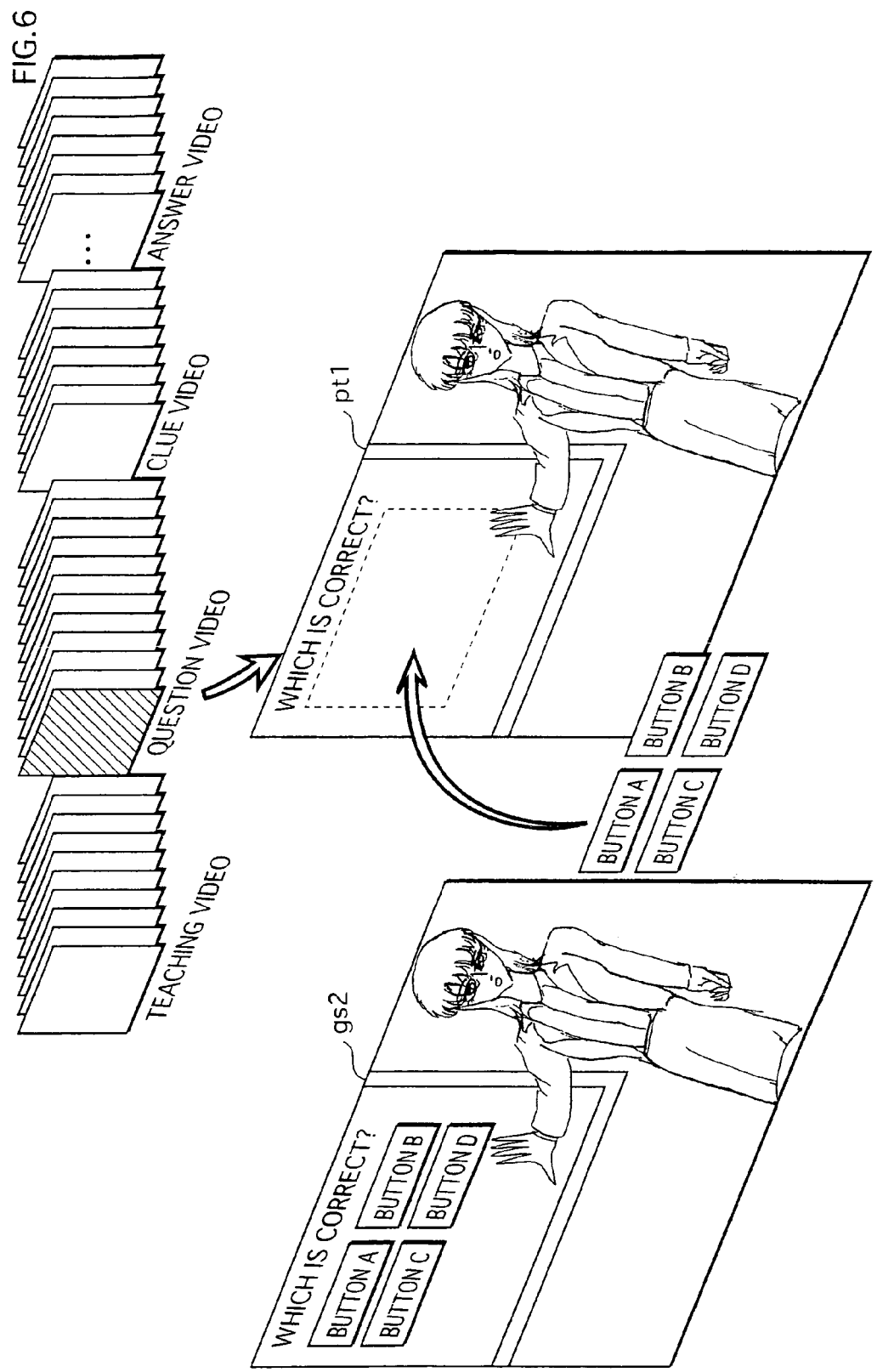
FIG. 6 shows that an interactive screen including a plurality of buttons, and picture data are combined together.

FIG. 6 shows that an interactive screen including a plurality of buttons, and picture data are combined together.

When the control by the ICS is at the same timing as a display timing of picture data pt1, the interactive screen including buttons A to D are combined to the picture data pt 1 and displayed (gs2). With use of the ICS, the interactive screen including a plurality of buttons is displayed according to the content of the movie, and a dramatic presentation can be realized.

Figure 7:
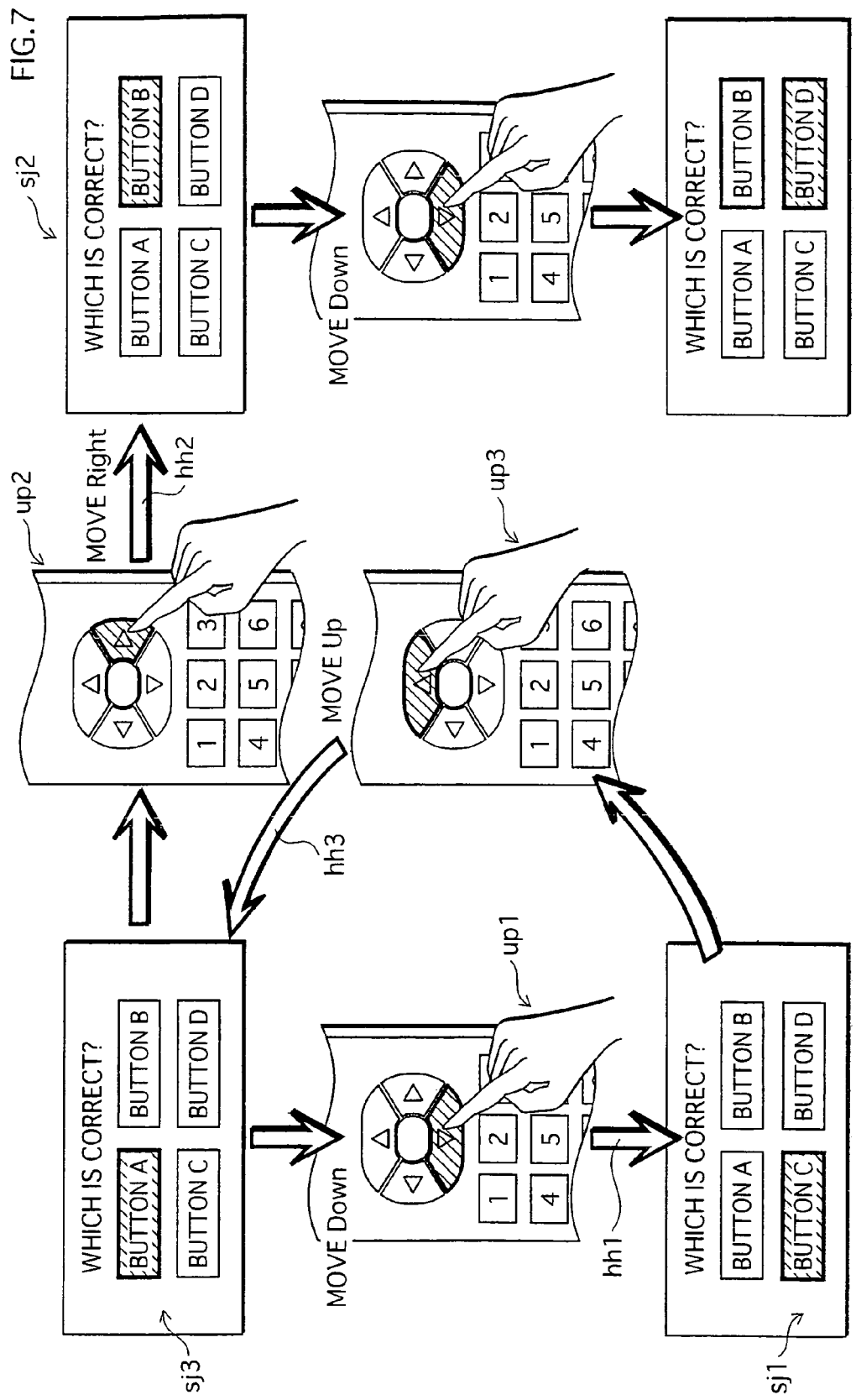
FIG. 7 shows state transitions of buttons A to D.
Figure 8:
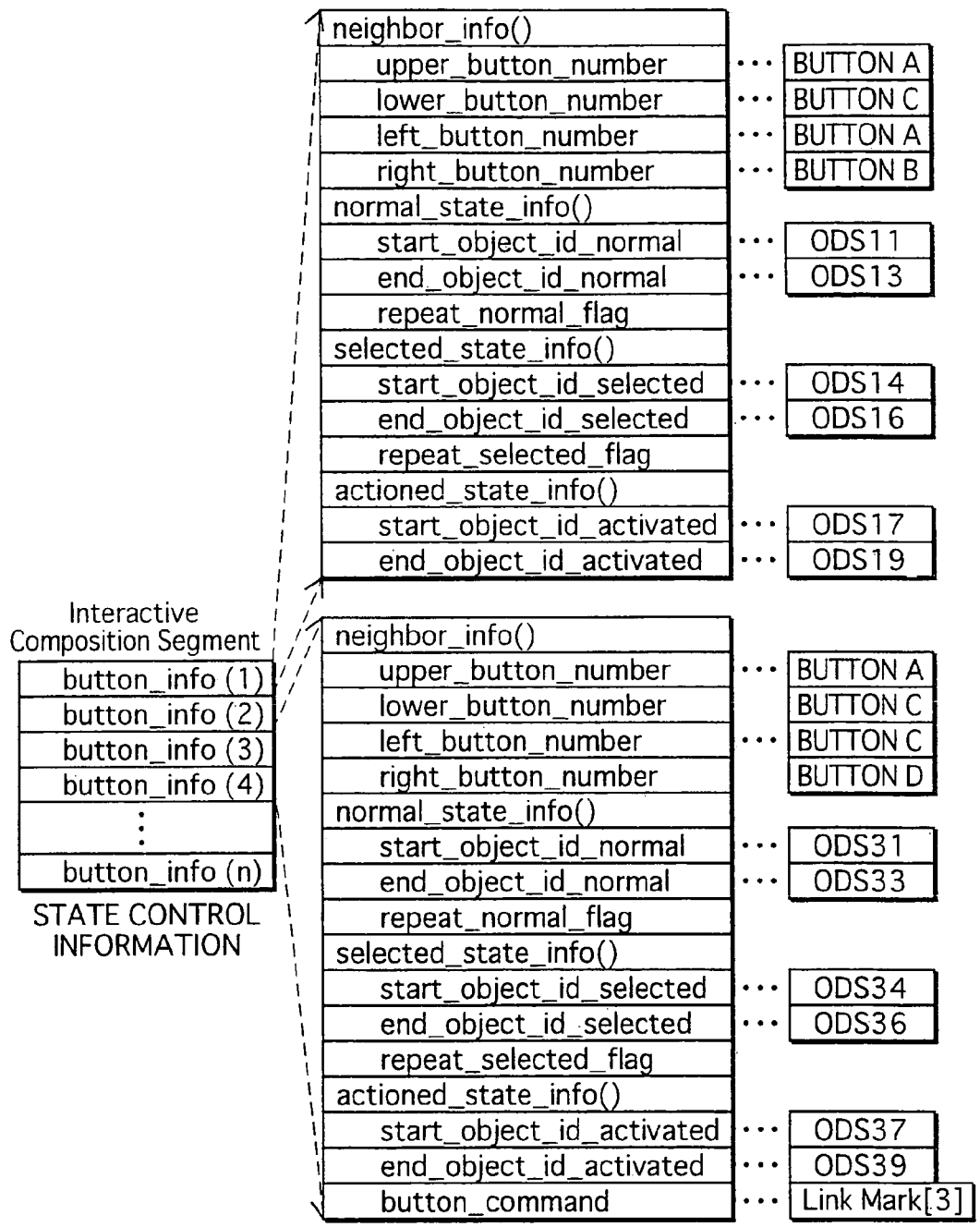
FIG. 8 shows an example description of the ICS when the states of the buttons A to D transit as FIG. 7 shows.

FIG. 8 shows an example description of the ICS when the states of the buttons A to D transit as FIG. 7 shows. The arrows hh1 and hh2 in FIG. 7 schematically represent the state transition of button info(1) as indicated by the neighbor_info( ). The lower_button_number included in the neighbor_info( ) of the button info(1) is set to the button C. Therefore, in the case where the button A is in the selected state and when a UO (User Operation) of pressing down the Move Down key occurs (up1 in FIG. 7), the state of the button C changes to the selected state (sj1 in FIG. 7). The right_button_number included in the neighbor_info( ) of the button info(1) is set to the button B. Therefore, in the case where the button A is in the selected state and when a UO of pressing down the Move Right key occurs (up2 in FIG. 7), the state of the button B changes to the selected state (sj2 in FIG. 7).

The arrow hh3 in FIG. 7 represents the state transition of button info(1) as indicated by the neighbor_info( ). The upper_button_number included in the neighbor_info( ) of the button info(1) is set to the button A. Therefore, in the case where the button C is in the selected state (up3) and when a UO of pressing down the Move Up key occurs, the state of the button A changes to the selected state.

Figure 9:
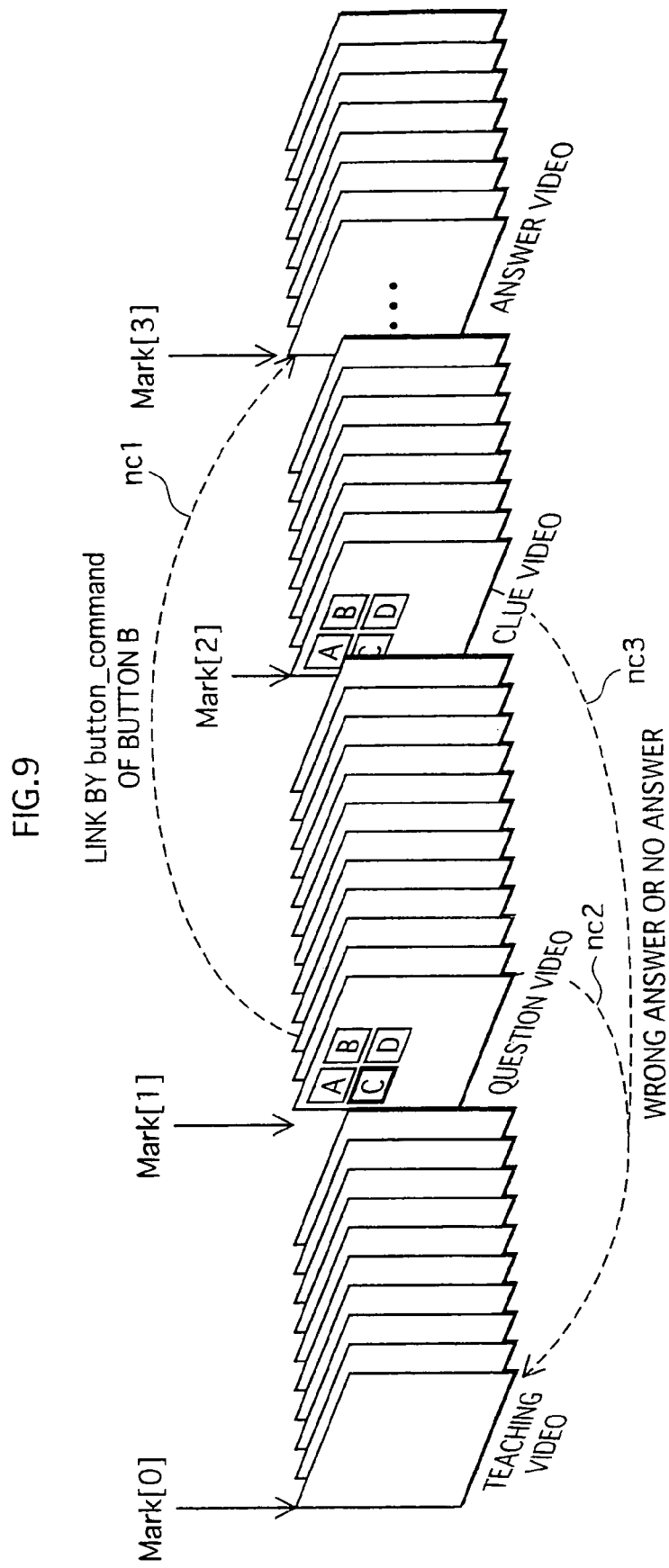
FIG. 9 schematizes a brancing based on a navigation command.

In the button command included in the button info(3), a navigation command "Link Mark[3]" is described. Therefore, this, navigation command "Link Mark[3]" is to be executed and a branching is to be performed when the button C is set to be in the active state. FIG. 9 schematizes the branching based on the navigation command. In FIG. 9, it is assumed that the present invention is to be applied to an educational application. The assumed playback control in the educational application is as follows.

Firstly, a "teaching video" is played for the user to study, and secondly a "question video" is played and an answer from the user is received. This is for testing the user's level of understanding. If no answer is inputted by the user, a "clue video" is played for help, and in the case where the answer inputted by the user is wrong or still no answer is inputted from the user after the clue video is played, the "teaching video" is to be played again as arrows nc2 and nc3 shows.

In such an application, in the case where an ICS is placed at a position corresponding to the "question video", and the first picture of an answer video is indicated by the LinkMark[3], the LinkMark[3] of the button_info(3) corresponding to the button C is executed when the button C is activated, and the answer video is to be played as an arrow nc1 shows. As described above, the playback proceeds from the interactive screen shown in FIG. 7 to the answer video.

This concludes the description of the interactive control. These are the description of the AVClip. Other pieces of information (Clip information and PL information) included in the BD-ROM are described next.

Figure 10:
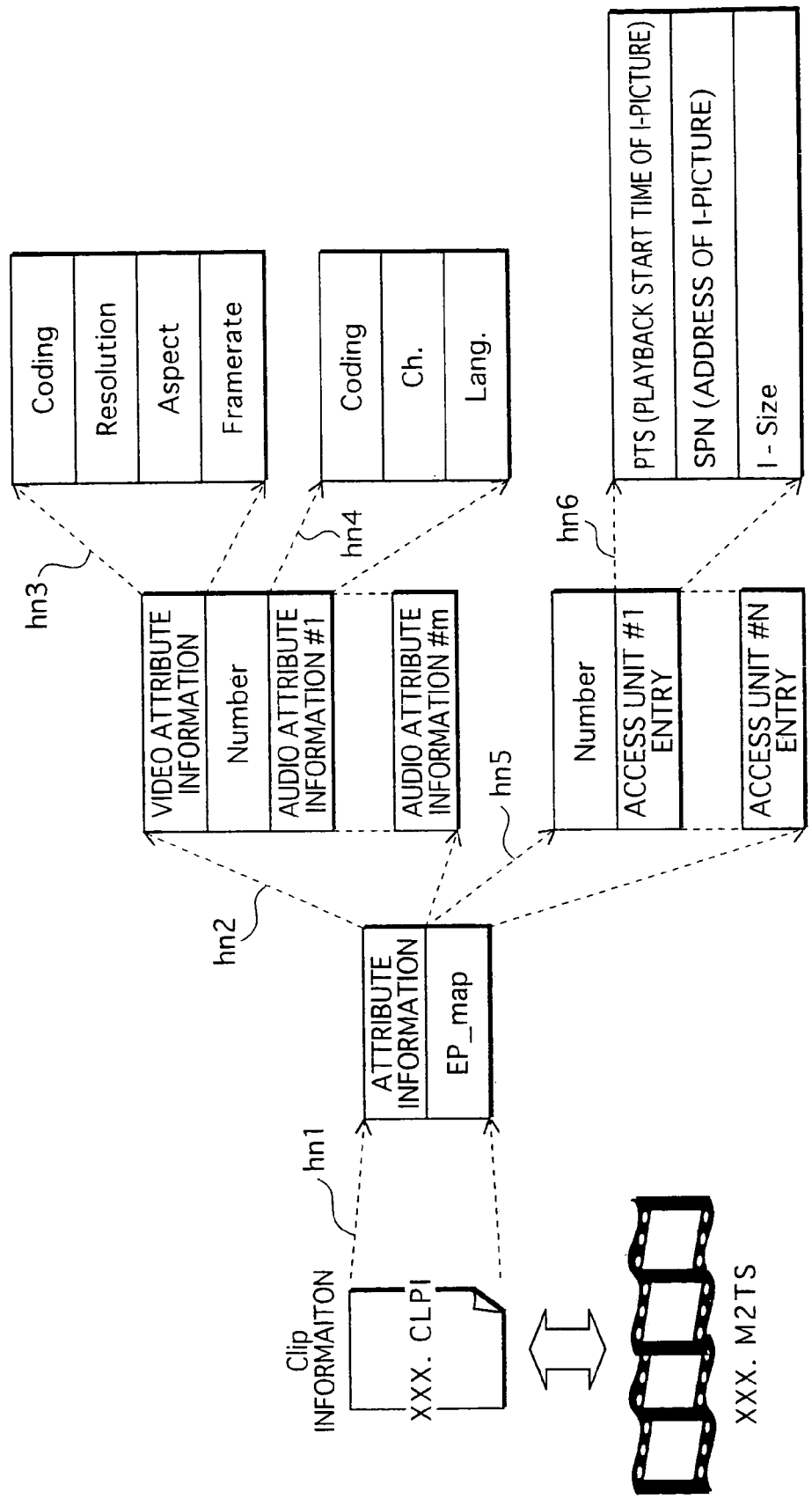
FIG. 10 shows an internal structure of Clip information.

Clip information (XXX.CLPI) is managing information relating to individual AVClips. FIG. 10 shows an internal structure of Clip information. The leaders in FIG. 10 highlight the Clip information structure. As the leader hn1 shows, the Clip information (XXX.CLPI) comprises "attribute information" relating to video and audio streams, and "EP_map", which is a reference table.

Attribute information (Attribute), as shown by the leader hn2, comprises attribute information relating to a video stream (Video attribute information), an attribute information number (Number), and attribute information relating to each of a plurality of audio streams multiplexed on the AVClip (Audio attribute information #1 to #m). The Video attribute information, as shown by the leader hn3, indicates the compression format used to compress the video stream (Coding), and the resolution (Resolution), aspect ratio (Aspect) and frame rate (Framerate) of individual pieces of picture data constituting the video stream.

On the other hand, Audio attribute information #1 to #m relating to the audio stream, as shown by the leader hn4, indicates the compression format used to compress the respective audio streams (Coding), and the channel number (Ch.), corresponding language (Lang.) of respective audio streams, and the sampling rate.

EP_map is a reference table for referring indirectly to the addresses of a plurality of cue positions using time information, and, as shown by the leader hn5, comprises plural pieces of entry information (ACCESS UNIT#1 entry, ACCESS UNIT#2 entry, ACCESS UNIT#3 entry, . . . ) and an entry number (Number). Each entry, as shown by the leader hn6, indicates a playback start time of a corresponding I-picture in correspondence with an I-picture address and the size (I-size) of the I-picture. The playback start time of an I-picture is expressed as a timestamp (Presentation Time stamp) of the I-picture. Also, the I-picture addresses are expressed by the serial numbers of TS packets (Source Packet Number or "SPN"). Note that the file name "XXX" of XXX.CPLI uses the same name as the AVClip to which the Clip information corresponds. In other words, the file name of the Clip information in FIG. 10, being "XXX", corresponds to AVClip (XXX.M2TS). This concludes the description of Clip information. PlayList information is described next.

Figure 11:
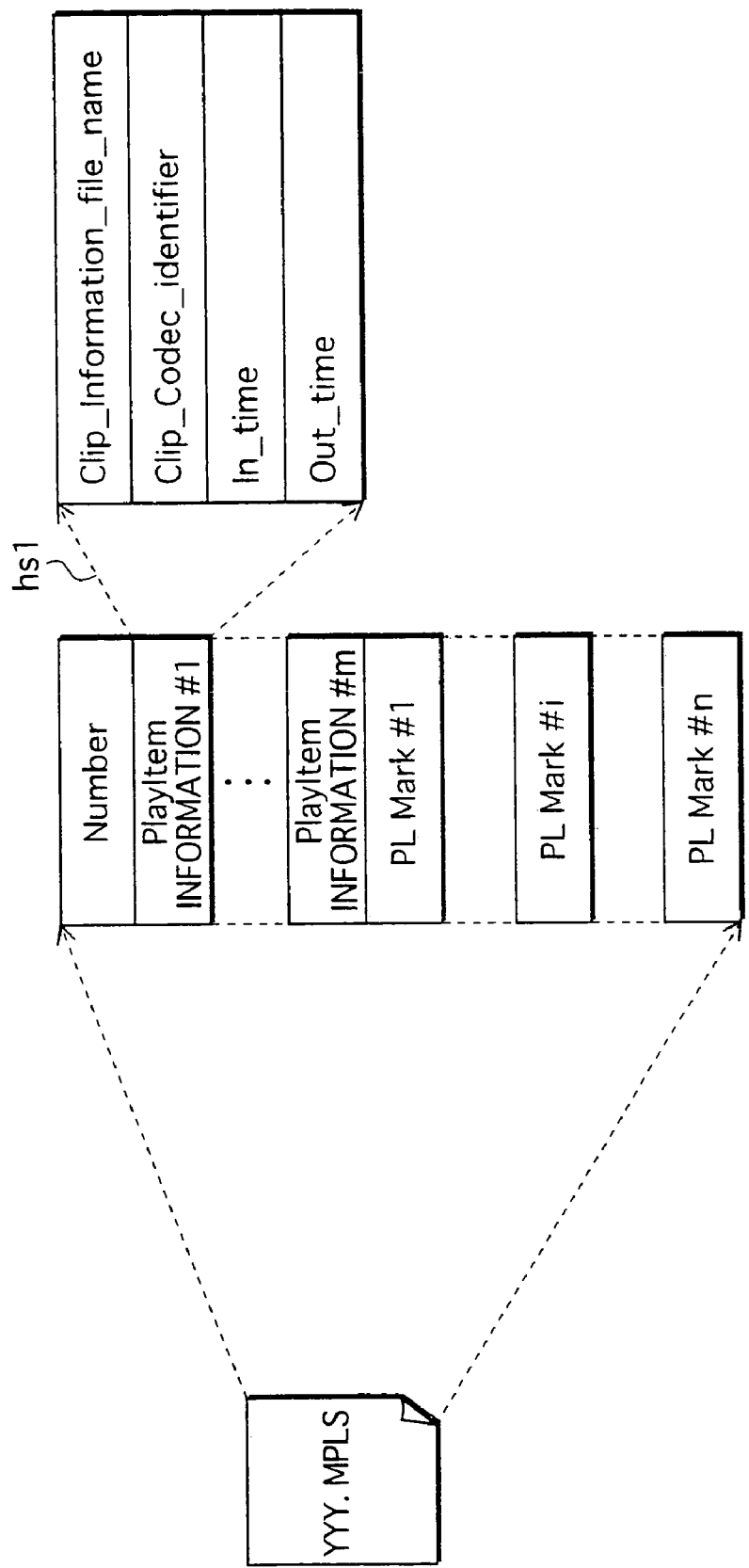
FIG. 11 shows an internal structure of PlayList information.
Figure 12:
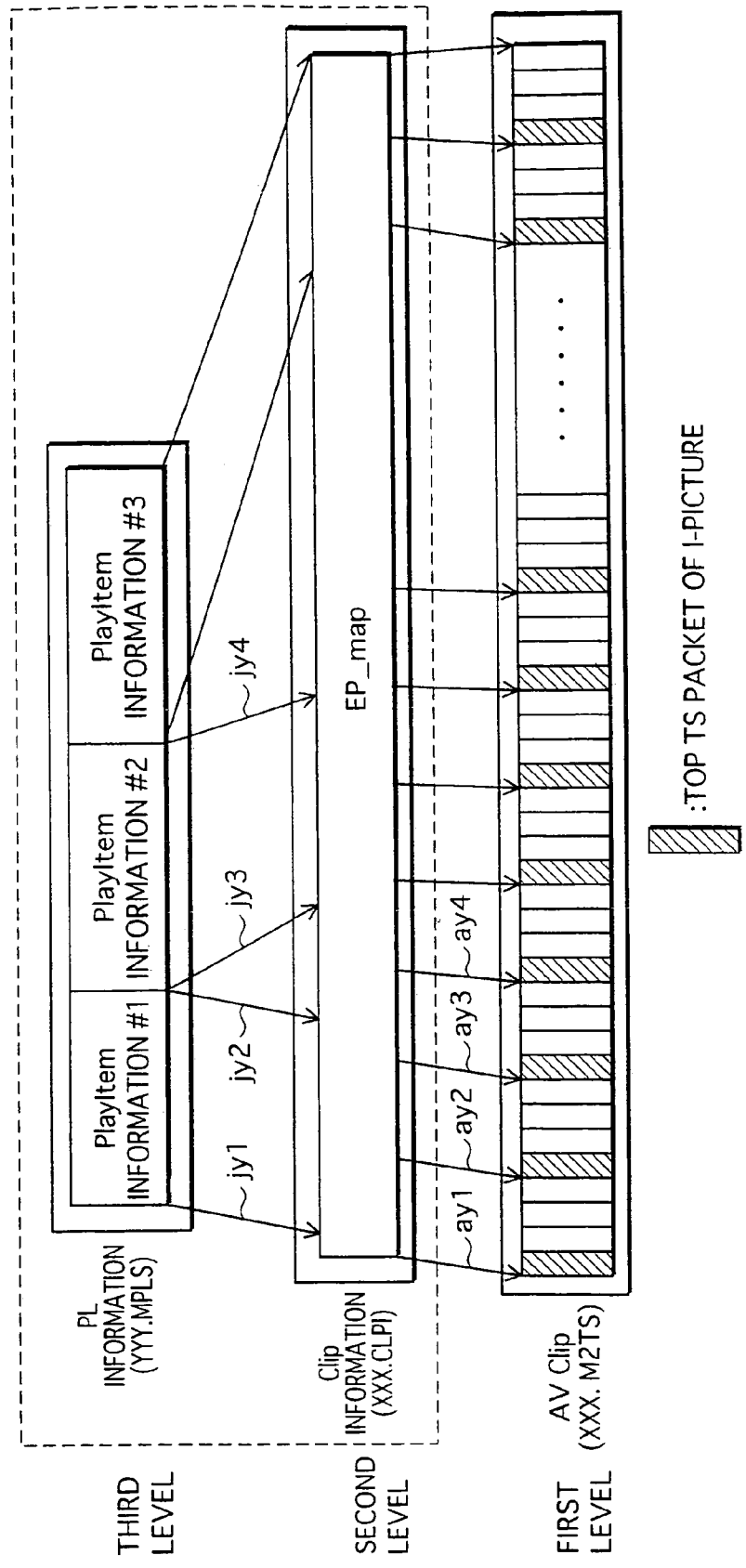
FIG. 12 schematizes time-series indirect referencing.

FIG. 11 shows the internal structure of the PlayList information. XXX.MPLS (PlayList information) is a table constituting a PlayList, which is playback path information, and comprises plural pieces of PlayItem information (PlayItem information #1, #2, #3, . . . , #n), a PlayItem information number (Number), and the above-described marker information (PLMark #1 to #n). PlayItem information defines one or more playback logical sections constituting a PlayList. The structure of PlayItem information is highlighted by the leader hs1. PlayItem information is, as shown by the leader hs1, constituted of a "Clip_information_file_name" indicating the file name of playback section information relating to an AVClip to which the In-point and Out-point of a playback section belong, a "Clip_codec_identifier" showing the encoding format used to encode the AVClip, an "IN_time", which is time information showing the start of a playback section, and an "OUT_time", which is time information showing the end of a playback section. A characteristic of PlayItem information is the notation. That is, playback sections are defined by an indirect referencing format that uses an EP_map as a reference table. FIG. 12 schematizes the time-series indirect referencing. In this figure, the EP_map included in the Clip information specifies the plurality of I-pictures as shown by the arrows ay1, ay2, ay3, and ay4. Arrows jy1, jy2, jy3, and jy4 in the Figure schematically show the referencing of the I-pictures using PlayItem information. In other words, this shows that the referencing by PlayItem information (the arrows jy1, jy2, jy3 and jy4) involves time-series indirect referencing in which I picture addresses included in the AVClip are specified via the EP_map.

Figure 13:
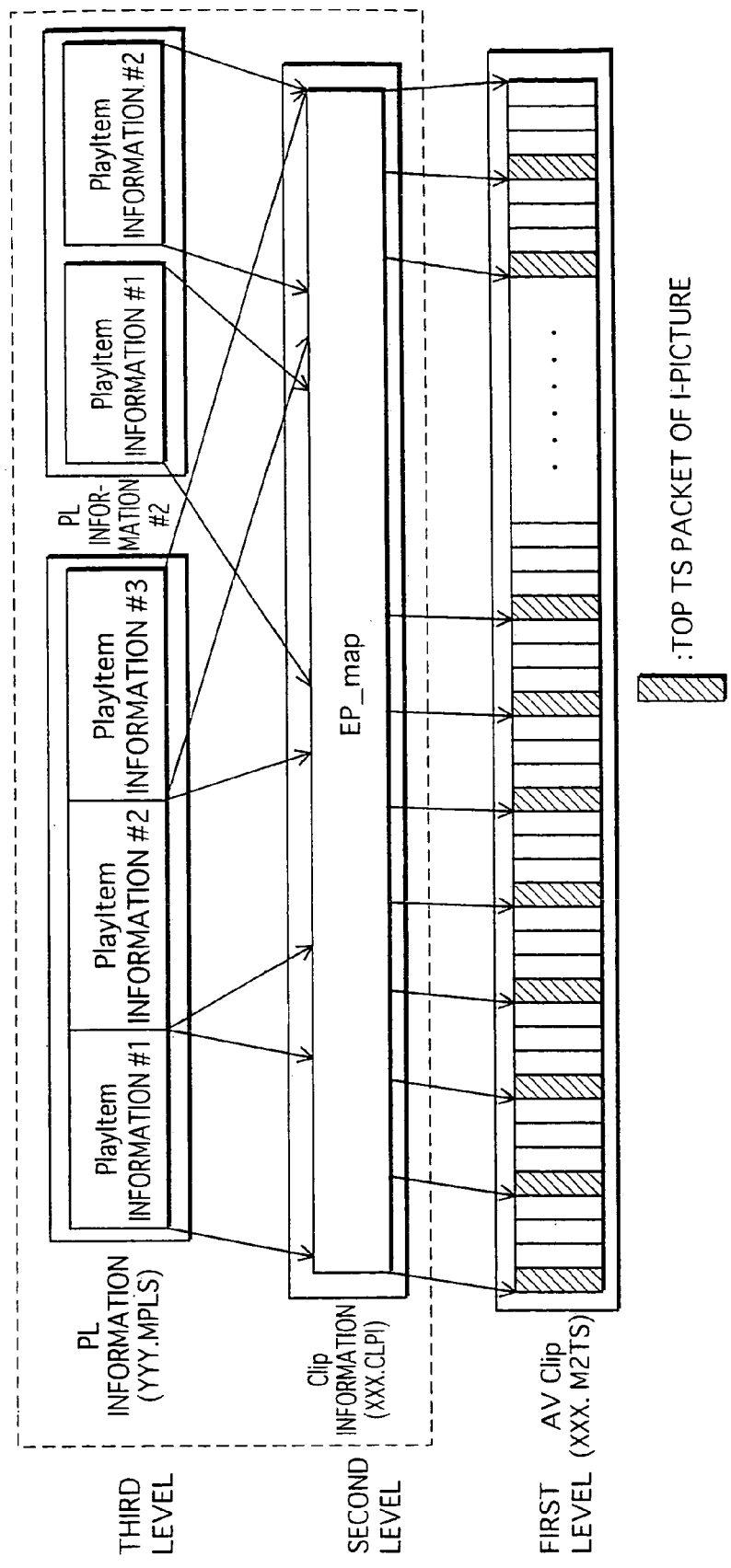
FIG. 13 shows an definition example of when a different PL (PL information #2) from the PL (PL information #1) shown in FIG. 12 is defined.

Playback sections on BD-ROM formed from groupings of PlayItem information, Clip information and AVClips are called "PlayItems". Playback units on a BD-ROM that are formed from groupings of PL information, Clip information and AVClips are called "PlayLists" (abbreviated as "PL"). Movie works recorded on a BD-ROM are structured in these logical playback units (PLs). Since movie works on a BD-ROM are structured in logical playback units, it is possible to easily create, as distinct from the main movie work, movie works from scenes in which only certain characters appear, for instance, by defining the PLs specifying these scenes. FIG. 13 shows a definition example of when a different PL (PL information #2) from the PL (PL information #1) shown in FIG. 12 is defined. Since movie works recorded on a BD-ROM have the above-described logical structure, AVClips constituting scenes in one movie work can be reused in another movie work efficiently.

The above-described Link commands are navigation commands available only in one PL. Therefore, it is impossible to realize extensive branching, such as branching from one PL to another PL.

This concludes the description of the PL and the PlayItem. PlayListMark (PLMark) is described next.

Figure 14:
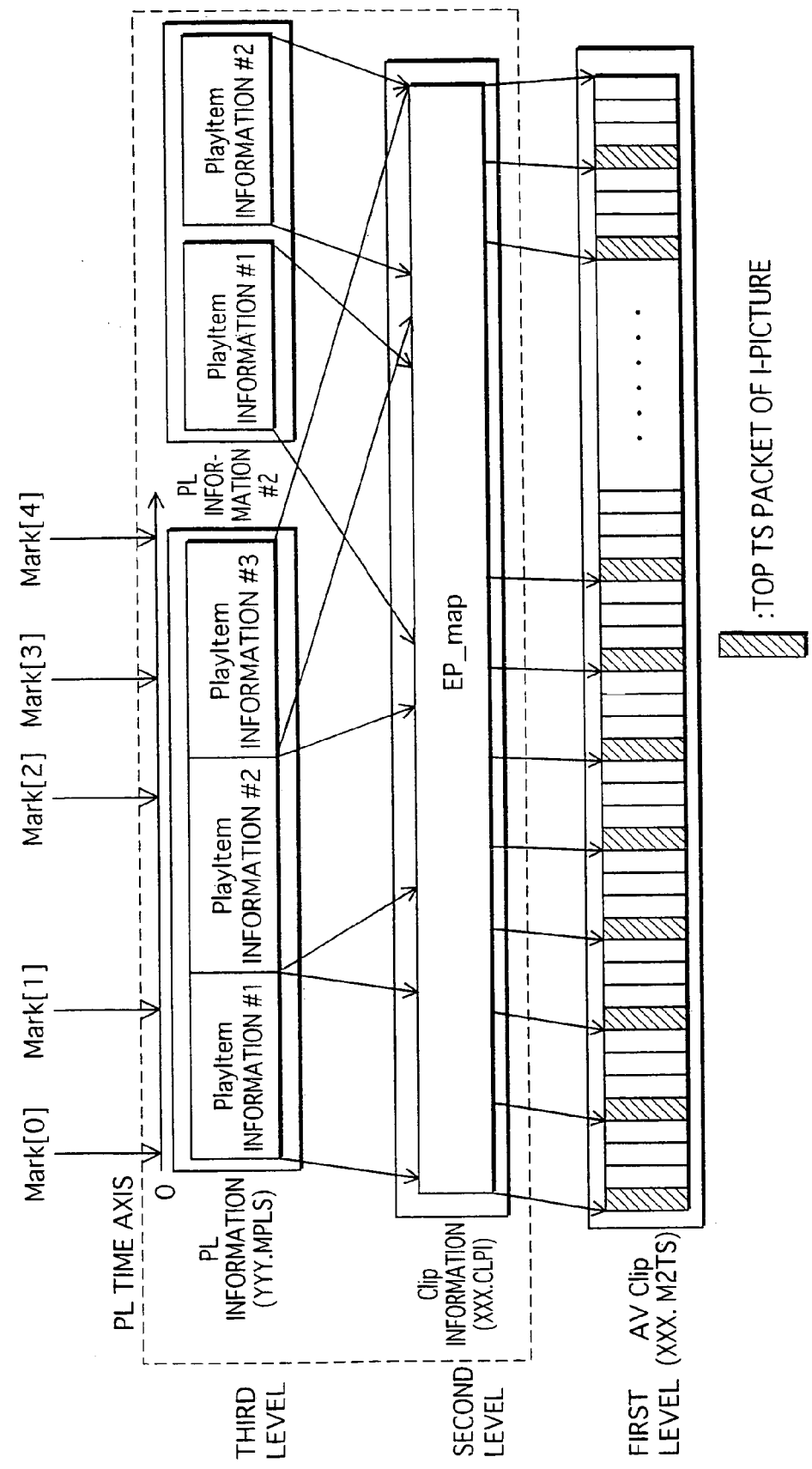
FIG. 14 shows an example of PLMarks set to the playback time axis of PL#1 shown in FIG. 13.

The PLMark is information specifying a plurality of time points in a PL time axis as cue positions. The PL axis is a time axis which is referred when an AVClip is played according to a PL. FIG. 14 shows an example of PLMarks set to the playback time axis of PL#1 shown in FIG. 13. In FIG. 14, the PL time axis is structured by adding time axes of PlayItem#1, PlayItem#2, and PlayItem#3 together. The arrows in the figure show cue positions indicated by PLMarks. In the figure, it is shown that arbitrary five points on the PL time axis are specified by the PLMarks.

This embodiment is characterized in that the cue positions specified by the PLMarks have two attributes. A position having the first attribute is an "Entry-mark" and a position having the second attribute is a "Link point".

Figure 15:
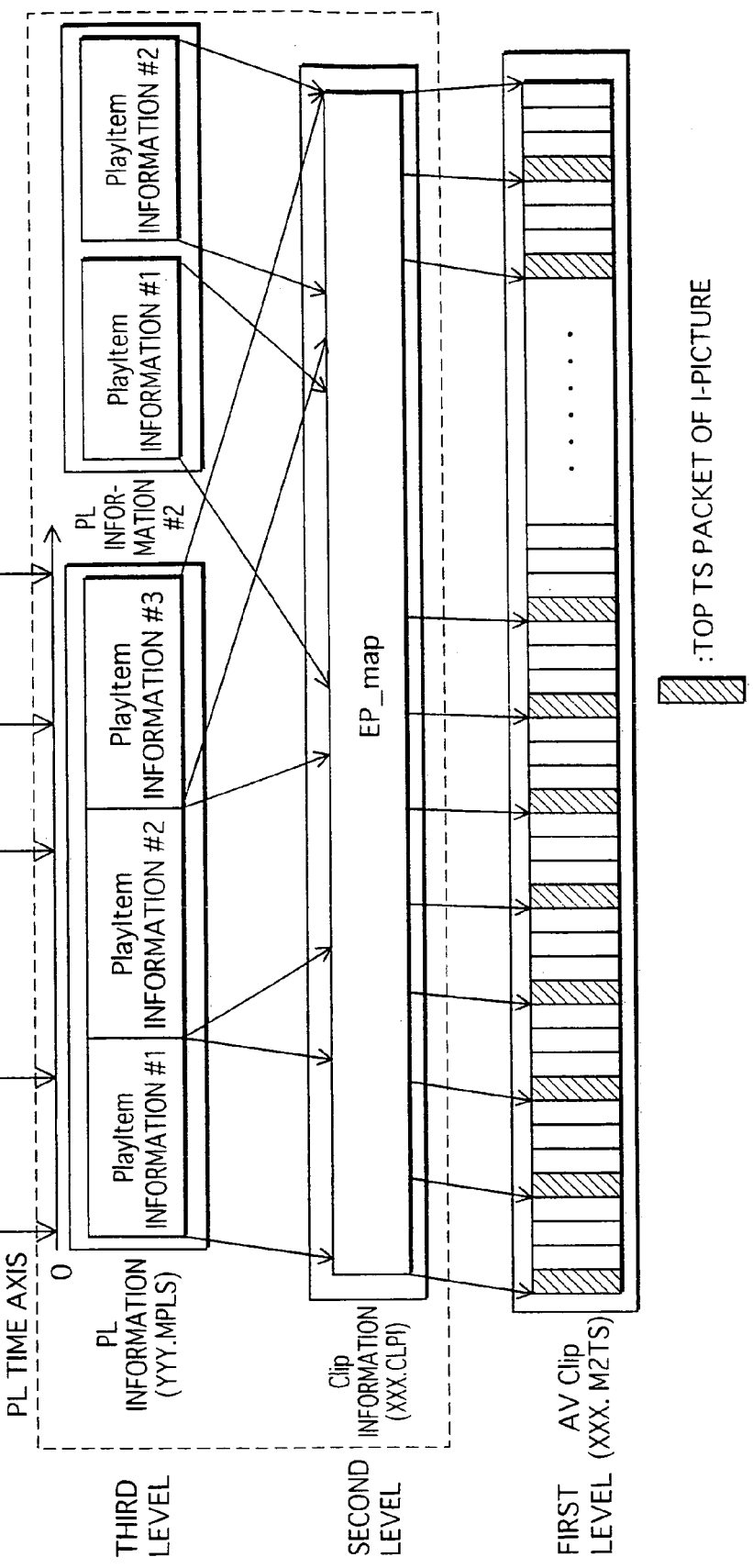
FIG. 15 is an example setting of attributes corresponding to each piece of Mark information shown in FIG. 14.

The "Entry-mark" is a cue position to which playback can jumps according to a user-skip, a Chapter Search, and Link commands for branching. FIG. 15 shows an example attribute setting for each piece of Mark information shown in FIG. 14. In this figure, attributes of PLMark[0], PLMark[1], PLMark [2], and PLMark[4] are set to Entry-mark. Therefore, playback can jump to the positions indicated by PLMark[0], PLMark[1], PLMark[2], and PLMark[4], but can not jump to other positions. In other words, playback can not jump to the position specified by PLMark[3], the position between PI#1 and PI#2, and the position between PI#2 and PI#3 no matter how many times the user-skip key is pressed. The start position and the end position of the PL#1 are specified by PLMark [0], PLMark[4] respectively, and therefore playback can jump to those positions. However, when those positions are not specified by the Mark information, playback can not jump to the positions by the user-skip or by the Chapter Search.

Figure 16:
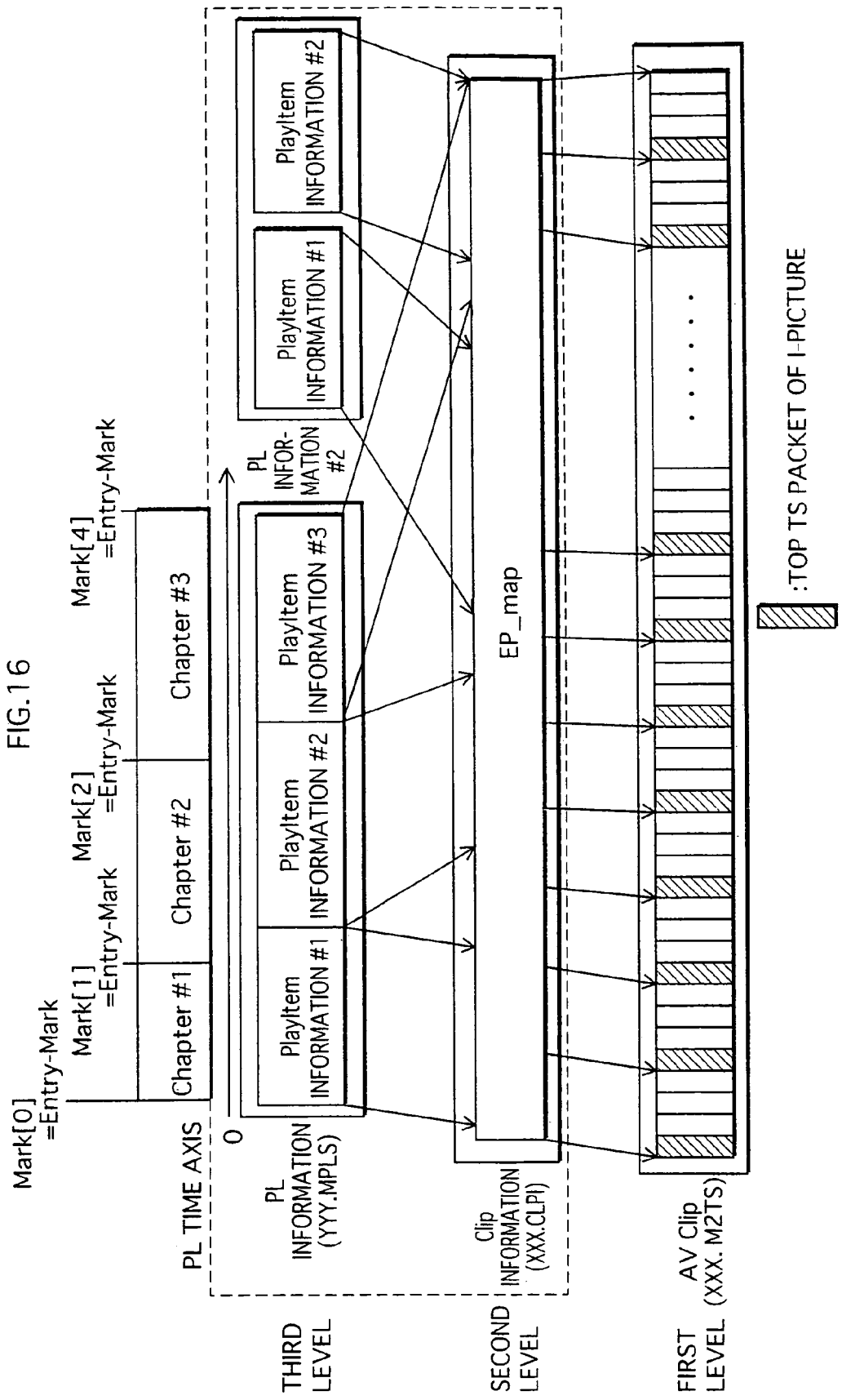
FIG. 16 shows Chapters defined by the Mark information in FIG. 15.

A series of Entry-marks in a PL define Chapters. Among the five PLMarks, PLMark[0], PLMark [1], PLMark [2], and PLMark[4] are Entry-marks. Therefore, each playback section partitioned by these PLMarks on the PL time axis becomes a Chapter. FIG. 16 shows the Chapters defined by the Mark information shown in FIG. 15. In the case where there is no Entry-mark at the end of a PL, a section from the last Entry-mark to the end of the PL becomes a Chapter. A Chapter Number is allocated to each Chapter. In case of Chapter Search, playback can jump to each Chapter with use of the allocated number. By the Chapter Search, a numeric value called a Chapter Number inputted by the user is received, and playback jumps to a Chapter specified by the numeric value. The Chapter Numbers show the order of Entry-marks in a PL. For instance, a value "1" is allocated to the Chapter starting from the first Entry-mark as a Chapter Number, and the value "2" is allocated to the Chapter starting from the second Entry-mark. One way for jumping to the Chapter is to use Chapter menu. A list of Chapters is shown in the Chapter menu, and the user can choose a Chapter from the list. This concludes the description of the Entry-mark.

The "Link point" is a position to which playback can jump by the navigation commands, such as the Link commands, but can not jump by the user-skip and the Chapter Search. For instance, when the clue video shown in FIG. 9 is desired to be played, the top picture is indicated by a PLMark, and the mark_type for PLMark is set to Link point. With this setting, the video can not be referred by the user-skip, but can be referred by the navigation commands, such as button command. This concludes the description of attributes of cue positions specified by the Mark information. The internal structure of the PLMark is described next.

Figure 17:
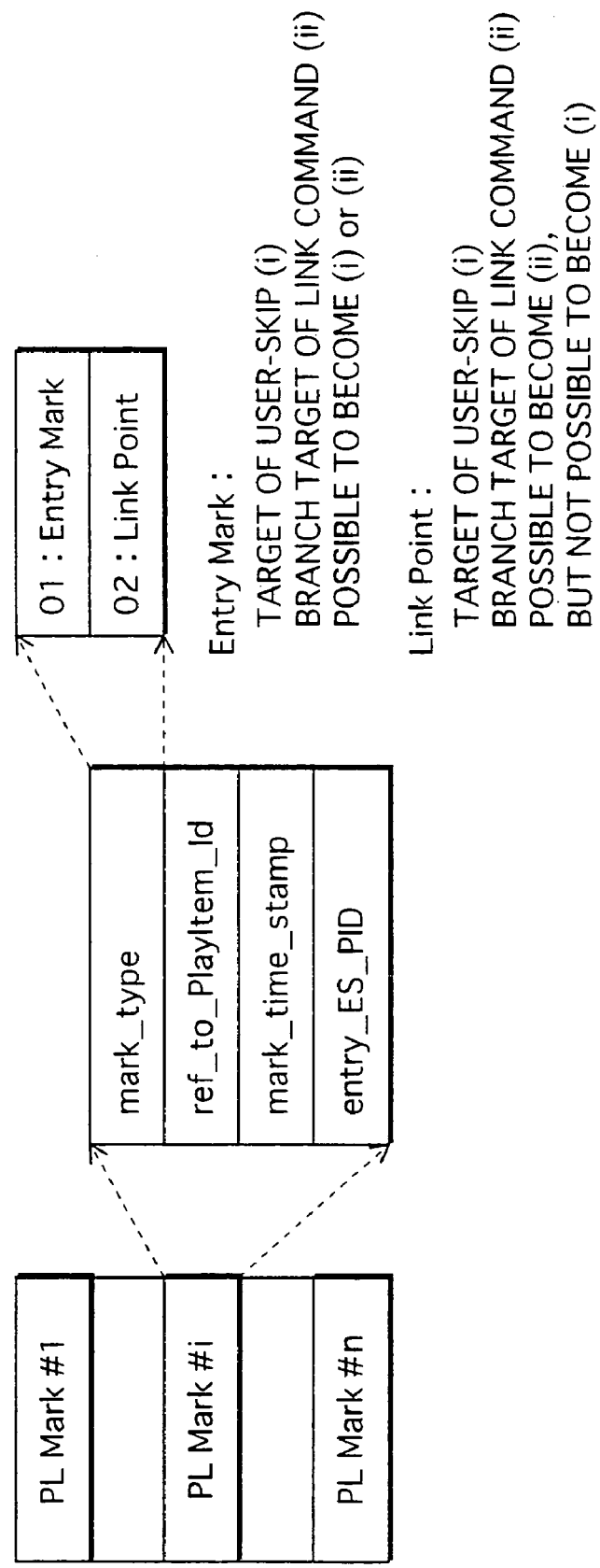
FIG. 17 shows an internal structure of any one of the plurality of the PLMarks (PLMark[i]) shown in FIG. 11.

FIG. 17 shows an internal structure of any one of the plurality of the PLMarks (hereinafter called PLMark[i]) shown in FIG. 11. As FIG. 17 shows, the PLMark[i] comprises "mark_type", "ref_to_PlayItem_Id", "mark_time_stamp", and "entry_ES_PID".

When the "mark_type" is "01", the position specified by the PLMark is the Entry-mark, and when the "mark_type" is "02", the position specified by the PLMark is the Link point.

The "ref_to_PlayItem_Id" specifies a PlayItem on the playback time axis of which a point of time on the playback time axis of an AVClip indicated by the PLMark exists.

The "mark_time_stamp" is time information indicating, on the playback time axis of the AVClip indicated by the PLMark, any point of time between an IN_time and an OUT_time of the PlayItem indicated by the ref_to_PlayItem_Id of PLMark.

The "entry_ES_PID" specifies an elementary stream, among a plurality of elementary streams multiplexed on an AVClip, to which a cue position is set. The PID is usually set to a default value (0xFFFF) so as to target all the plurality of elementary streams multiplexed on an AVClip. When the "entry_ES_PID" indicates a PID of a specific elementary stream, the marker information specifies a cue position on the playback time axis of indicated elementary stream.

Figure 18:
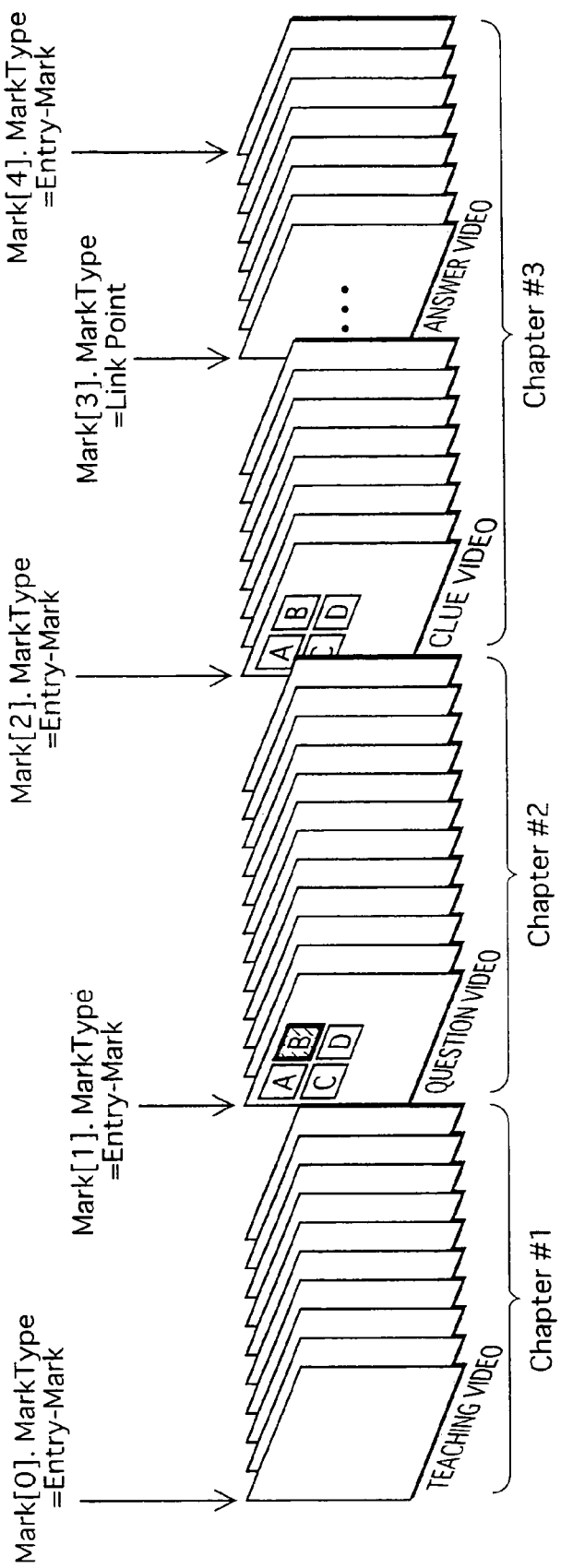
FIG. 18 shows, a section corresponding to a teaching video (Chapter 1), a section corresponding to a question video (Chapter 2), and a section corresponding to a clue video (Chapter 3)

The following is a description of a specific example of a cue-up operation for searching a point of time indicated by a PLMark. The PLMark in this example is same as the PLMark shown in FIG. 15 and FIG. 16. The top pictures of the teaching video, the question video, the clue video, and the answer video are at positions on the PL time axis respectively specified by the PLMark[1], PLMark[2], PLMark[3], and PLMark [4] in the figures. In this case, as FIG. 18 shows, the teaching video corresponds to the Chapter 1, the question video corresponds to the Chapter 2, and the clue video corresponds to the Chapter 3. The top picture of the answer video is specified by the PLMark[3], but the start point of the PLMark[3] is the Link point, and therefore the start point of the answer video is not the start point of a Chapter. In other words, the top picture of the answer video is specified by the PLMark, but at the same time, not the start point of a Chapter.

Figure 19:
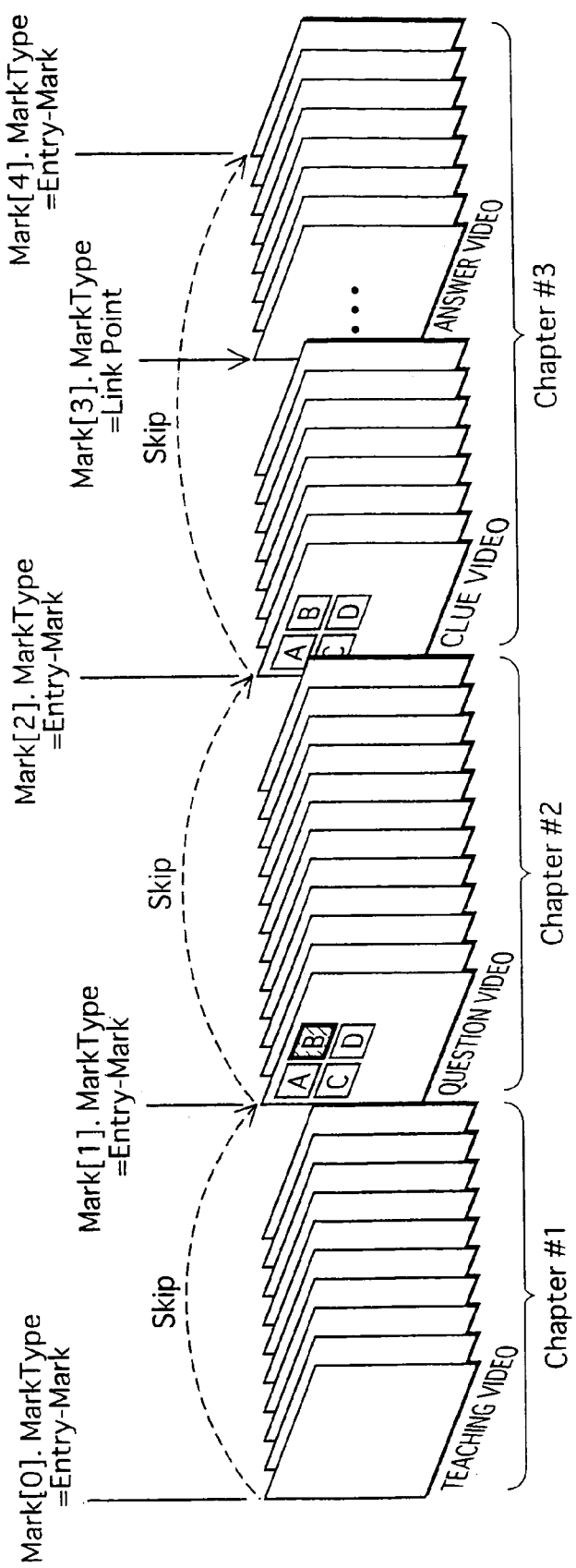
FIG. 19 shows a cue-up operation by a user-skip.
Figure 20:
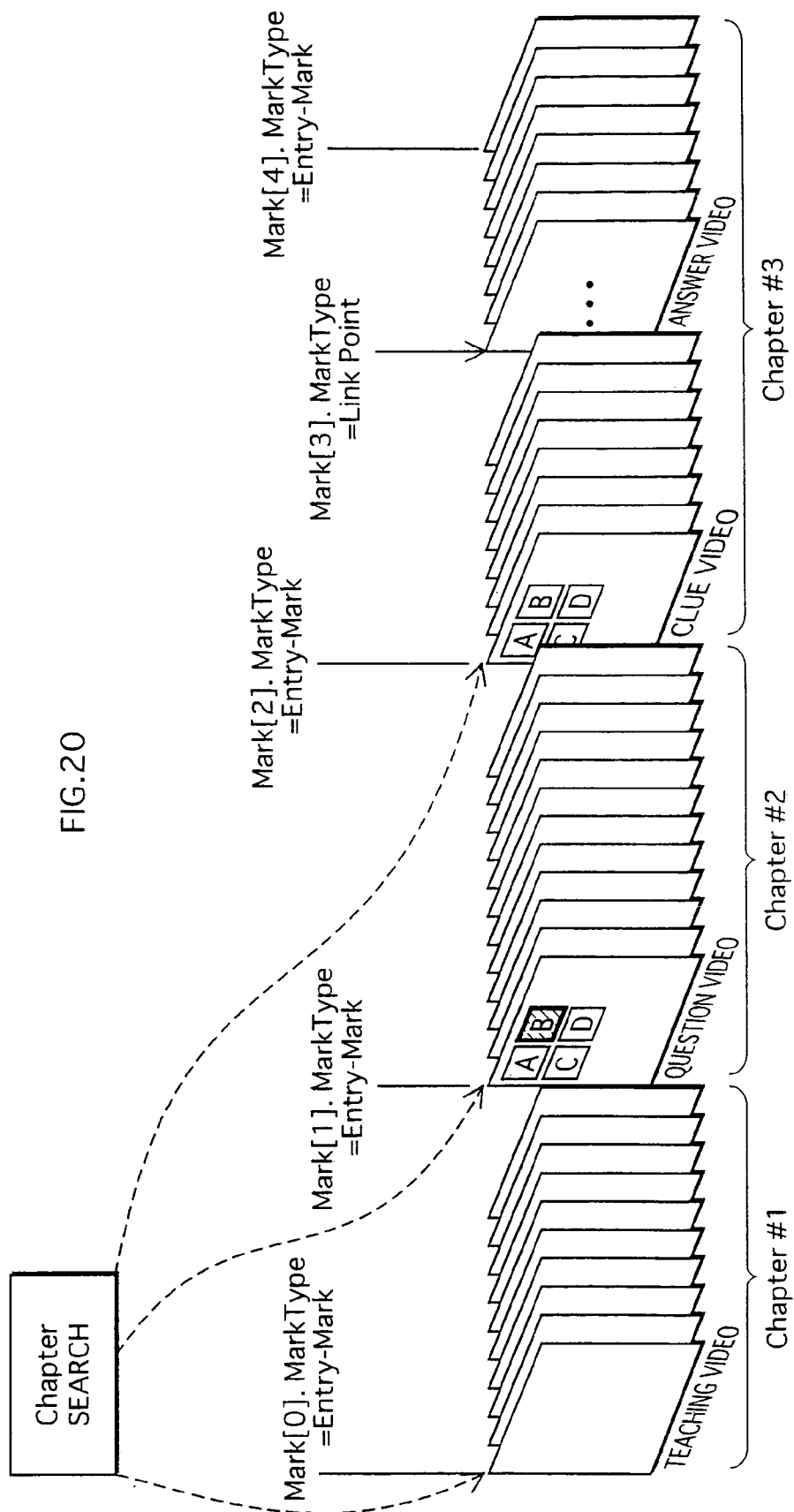
FIG. 20 shows a cue-up operation by Chapter Search.
Figure 21:
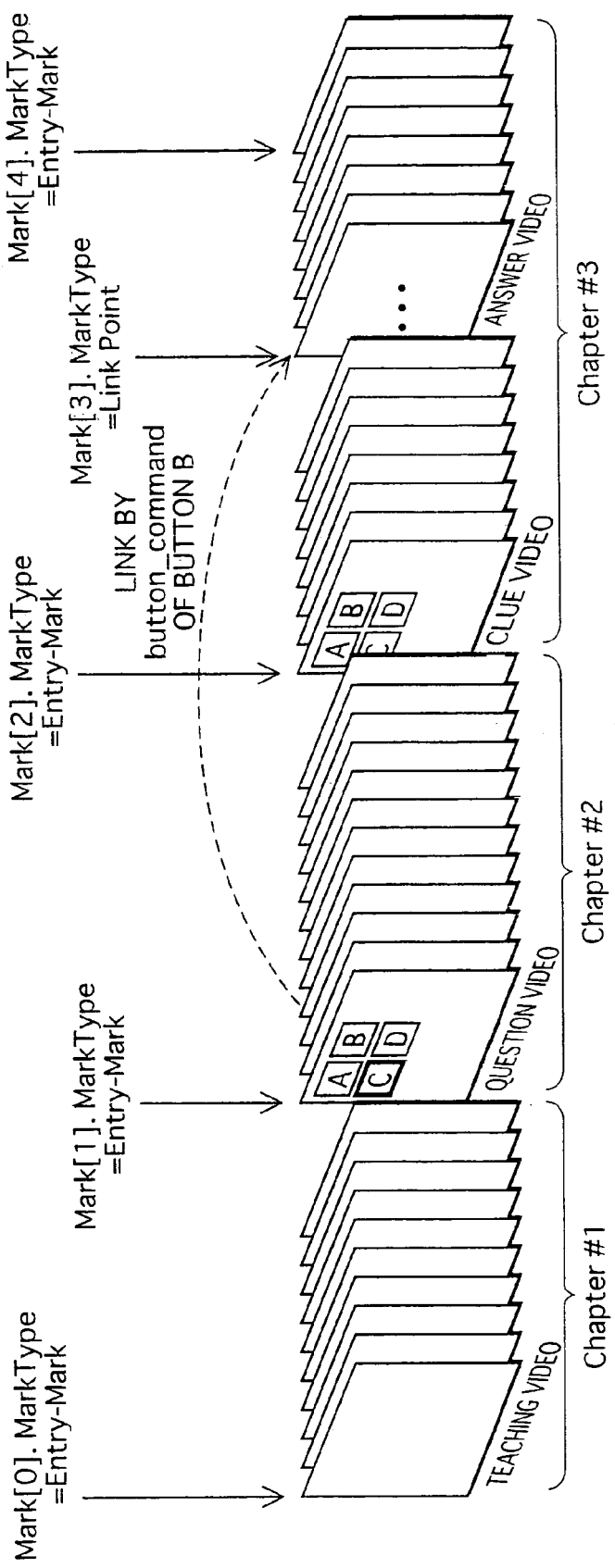
FIG. 21 shows a cue-up operation by button commands.

In the AVClip divided into a plurality of Chapters as described above, how the cue-up operation is performed is shown in FIG. 19 to FIG. 21. FIG. 19 shows the cue-up operation with use of the user-skip.

The arrows in this figure schematize the user-skip based on a user operation. When the cue-up operation by the user-skip is performed, the teaching video, the question video, and the clue video are displayed in this order. On the other hand, the top picture of the answer video is not displayed by the user-skip because it is specified by the PLMark but its mark_type is the Link point.

FIG. 20 shows the cue-up operation with use of the Chapter Search. The arrows in this figure schematize the cue-up operation by the Chapter Search. Also by the Chapter Search, playback can jump to the top pictures of the teaching video, the question video, and the clue video when their mark_types are the Entry-marks, but can not jump to them when their mark_types are the Link points. Therefore, a person in charge of authoring contents can set the mark_type so that playback can jump to Entry-marks, but can not jump to the Link points. This protects the content from a cue-up operation operated in a manner which is not expected by the author.

FIG. 21 shows a cue-up operation by button commands. The arrows in this figure schematize the cue-up operation by button commands. When the cue position specified by a button command is PLMark[3], playback can jumps to the top picture of the answer video, which is specified by PLMark[3], according to the button command. This means that when the button command is executed, the playback starts from the top picture of the answer video.

As described above, playback can not jump to a point of time specified by the PLMark representing the Link point by the user-skip or the Chapter Search, but can jump to the point by the button commands. With the above-described PLMark setting, playback can not jump to the top picture of the answer video by the user-skip or the Chapter Search, but can jump to the picture by the button commands, and therefore it is possible to hide the answer video from the user.

The PLMark exists for each PL. Therefore, in the case where an AVClip is referred by a plurality of PL, a picture specified by a PLMark is different for each PL which refers the AVClip. In other words, a point of time to which playback jumps according to a mark number in operands of a button command is different for each PL referring the AVClip. This means that the creator can set the content so that a cue-up operation for searching a video at a certain point of time is allowed in one PL, but not allowed in another PL, and so on.

The above-described data structure of the Display Set (the ICS, the PDS, and the ODS) is an instance of a class structure written in a program language, and the creator who performs authoring can obtain the data structure on a BD-ROM by writing the class structure according to the Blu-ray Prerecording Format.

This concludes the embodiment of the recording medium pertaining to the present invention. The embodiment of the playback device pertaining to the present invention is described next.

Figure 22:
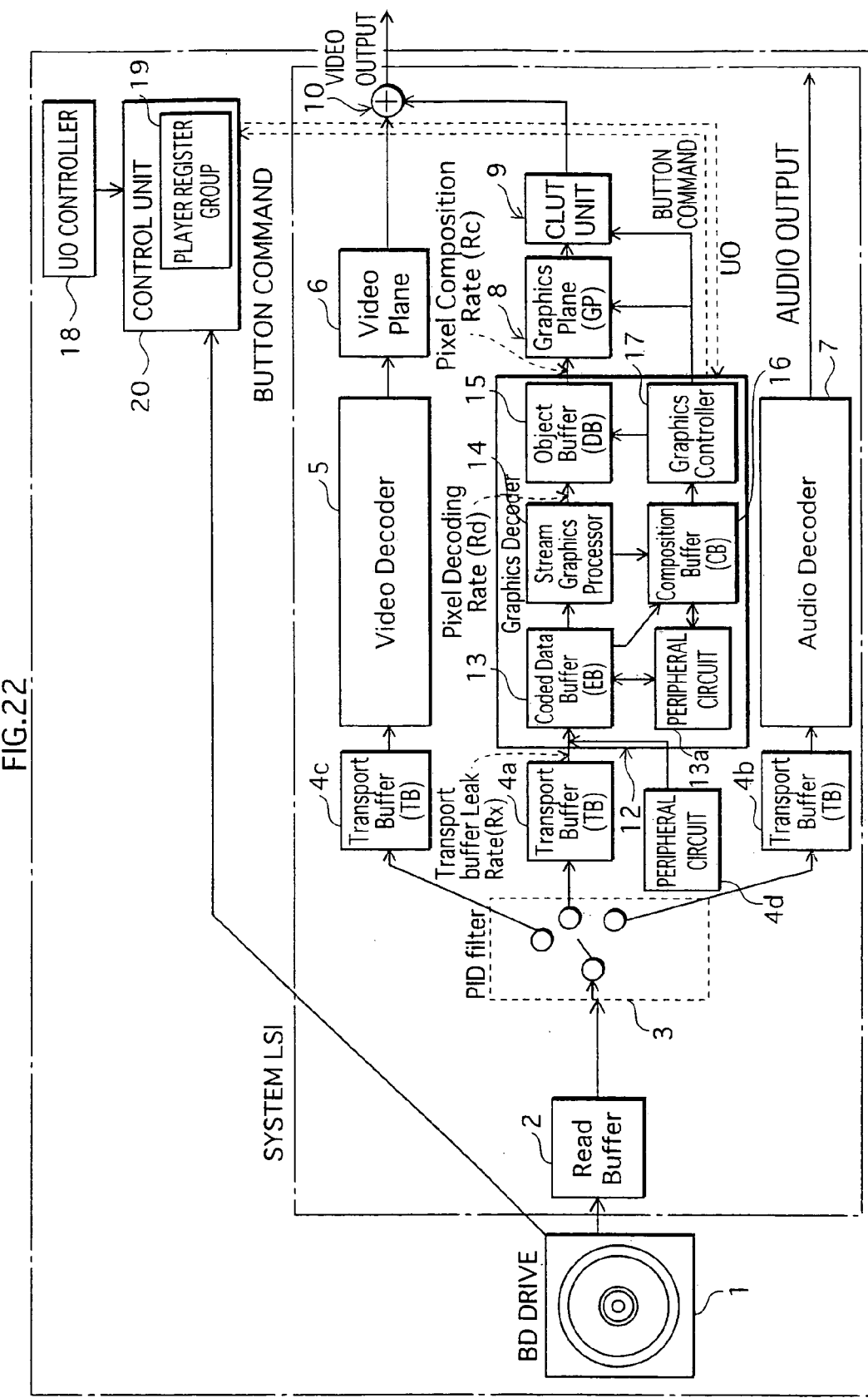
FIG. 22 shows an internal structure of a playback device pertaining to the present invention.

FIG. 22 shows the internal structure of a playback device pertaining to the present invention. A playback device pertaining to the present invention can be produced industrially based on the internal structure shown in the figure. A playback device pertaining to the present invention comprises three main parts, namely, a system LSI, a drive device, and a microcomputer system, and can be produced industrially by mounting these parts to the cabinet and substrate of a device. The system LSI is an integrated circuit that integrates a variety of processing units for carrying out the functions of the playback device. A playback device thus produced is structured from a BD drive 1, a read buffer 2, a PID filter 3, transport buffers 4a, 4b, and 4c, a peripheral circuit 4d, a video decoder 5, a video plane 6, an audio decoder 7, a graphics plane 8, a CLUT unit 9, an adder 10, a graphics decoder 12, a coded data buffer 13, a peripheral circuit 13a, stream graphics processor 14, an object buffer 15, a composition buffer 16, a graphics controller 17, an UO controller 18, a player register group 19, and a control unit 20.

The BD-ROM drive 1 performs loading/ejecting of BD-ROMs, and accesses loaded BD-ROMs.

The read buffer 2 is a FIFO memory that stores TS packets read from BD-ROMs on a first-in first-out basis.

The PID filter 3 performs filtering on a plurality of TS packets outputted from the read buffer 2. The filtering by the PID filter 3 is performed by writing only TS packets having desired PIDs into the transport buffers 4a, 4b, and 4c. The filtering by the PID filter 3 does not require buffering. Therefore, the TS packets inputted into the PID filter 3 are immediately written into the transport buffers 4a, 4b and 4c.

The transport buffers 4a, 4b, and 4c are memories that store TS packets outputted from the PID filter 3 on a first-in first-out basis.

The peripheral circuit 4d uses the wired logic to convert the TS packets read from the transport buffer 4a into function segments. The function segments obtained by the conversion are to be stored in the coded data buffer 13.

The video decoder 5 writes uncompressed-format pictures obtained by decoding the plurality of TS packets outputted from the PID filter 3 to the video plane 6.

The video plane 6 is a plane for moving pictures.

The audio decoder 7 outputs uncompressed-format audio data obtained by decoding TS packets outputted from PID filter 3.

The graphics plane 8 is a memory having a single screen capacity area that can store one screen worth of uncompressed graphics images.

The CLUT unit 9 converts the index colors in the uncompressed graphics images stored in the graphics plane based on the values of Y, Cr, and Cb indicated by the PDS.

The adder 10 outputs synthesized images which are obtained by multiplying the uncompressed graphics whose colors are converted by the CLUT unit 9 by the T value (transparency), and adding the multiplied graphics to the uncompressed picture data stored in the video plane on a pixel-to-pixel basis.

The graphics decoder 12 writes uncompressed graphics obtained by decoding graphics streams to graphics plane 8 as graphics objects. Subtitles, menus and the like appear on a screen as a result of decoding graphics streams. The graphics decoder 12 comprises the coded data buffer 13, the peripheral circuit 13a, the stream graphics processor 14, the object buffer 15, the composition buffer 16, and the graphics controller 17.

The code data buffer 13 is a buffer in which the function segments are to be stored with a DTS and a PTS. These function segments are obtained by removing a TS packet header and a PES packet header from each TS packet of the transport stream stored in the transport buffer 4a, and disposing the payload sequentially. Among the removed TS packet headers and PES packet headers, the PTS/DTS are to be stored in relation to PES packets.

The peripheral circuit 13a uses wired logic to realize the transfer between the coded data buffer and stream graphics processor 14 and the transfer between the coded data buffer 13 and composition buffer 16. During these transfers, at the time indicated by the DTS in the ODS, the ODS is transferred from the coded data buffer 13 to the stream graphics processor 14. Also, at the time indicated by the DTSs in the ICS and the PDS, the ICS and the PDS are transferred to the composition buffer 16 respectively.

The stream graphics processor 14 writes uncompressed graphics comprising index colors obtained by decoding the ODS to the object buffer 15 as graphics object. This decoding by the stream graphics processor 14 starts at the time indicated by the DTS related to the ODS, and finishes before the time indicated by the PTS related to the ODS. The decode rate Rd of the above-described graphics object is the output rate of the stream graphics processor 14.

In the object buffer 15, the graphics object obtained by the decoding by the stream graphics processor 14 is to be disposed.

The composition buffer 16 is a memory in which the ICS and the PDS are to be disposed.

The graphics controller 17 interprets the ICS disposed in the composition buffer 16 and performs a control based on the ICS.

The UO controller 18 detects user operations performed with respect to the remote controller, the front panel of the playback device or the like, and outputs information showing detected user operations (hereinafter called "UO information") to the control unit 20.

The player register group 19 is registers included in the control unit 20, and comprises 32 individual Player Status Registers and 32 individual General Purpose Registers. The setting values (PSR) of the Player Status Registers have the following meanings. The notation "PSR(x)" refers to the setting value of the $x^{th}$ Player Status Register.

PSR(0): Reserved
PSR(L): stream number of audio stream targeted for decoding
PSR(2): stream number of auxiliary graphics stream targeted for decoding
PSR(3): number showing angle setting by user
PSR(4): number of Title currently targeted for playback
PSR(5): number of Chapter currently targeted for playback
PSR(6): number of PL currently targeted for playback
PSR(7): number of PlayItem currently targeted for playback
PSR(8): current PTM indicating a playback position on the AVClip time axis
PSR(9): count value of navigation timer
PSR(10): number of button currently in selected state
PSR(11)-(12): Reserved
PSR(13): setting of parental level by user
PSR(14): setting related to video playback of playback device
PSR(15): setting related to audio playback of playback device
PSR(16): language code showing audio setting in playback device
PSR(17): language code showing subtitle setting in playback device
PSR(18): language setting for rendering menu
PSR(19)-(63): Reserved The control unit 20 performs an integrative control based on an interactive communication between the control unit 20 and the graphics decoder 12. The communication from the control unit 20 to the graphics decoder 12 means that the UO received by the UO controller 18 is transmitted to the graphics decoder 12. The communication from the graphics decoder 12 to the control unit 20 means the button commands included in the ICS are outputted to the control unit 20.

This concludes the description of the internal structure of the playback device. How to implement the control unit 20 and the graphics decoder 12 is described next. The control unit 20 can be implemented by creating programs for performing the processing procedures shown in FIG. 23 to FIG. 25 and having a general purpose CPU read the created programs. The processing procedures of the control unit 20 are described next with reference to FIG. 23 to FIG. 25.

Figure 23:
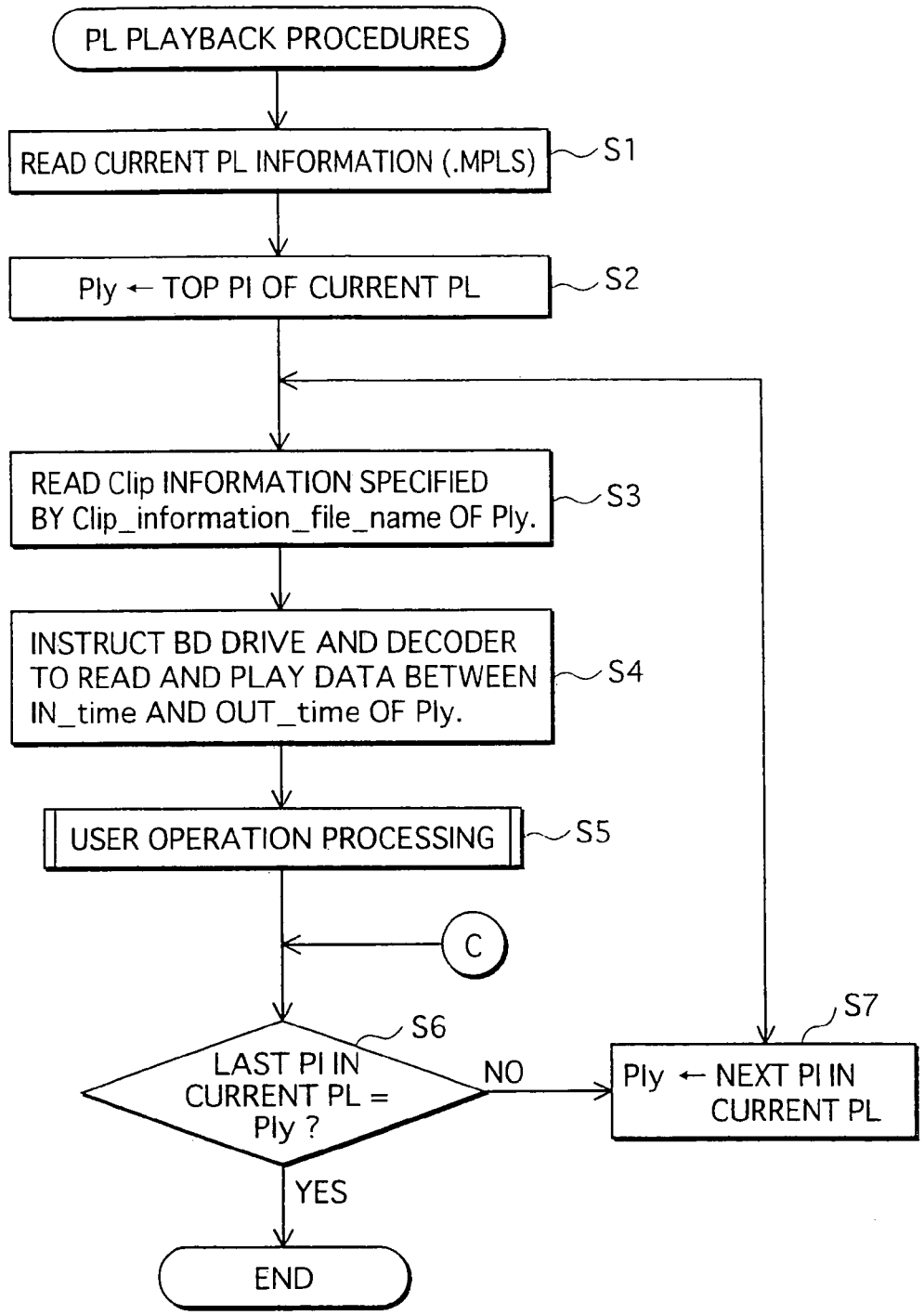
FIG. 23 is a flowchart showing a playback procedures performed by a control unit 20 based on a PL.

FIG. 23 is a flowchart showing the playback procedures performed by the control unit 20 based on a PL.

In this flowchart, PIy is the PlayItem targeted for processing. In the flowchart, current PL information (.mpls) is read (Step S1), and the top PI information of the current PL information is set as the PIy (Step S2). Then, the Clip information specified by Clip_information_file_name of the PIy is read (Step S3).

In Step S4, the BD drive 1, the video decoder 5, the audio decoder 7, and the graphics decoder 12 are instructed to perform reading and decoding data between the IN_time and the OUT_time of the PIy. By the above-described Steps S3 to S4, a portion of AVClip indicated by the PIy is played.

Then, after Step S5, it is judged whether or not the PIy is the last PI in the current PL in Step S6, and if not, the next PI in the current PL is set as the PIy (step S7), and the process returns to Step S3. By repeating Steps 3 to 7, the PIs comprising the PL are played sequentially.

Figure 24:
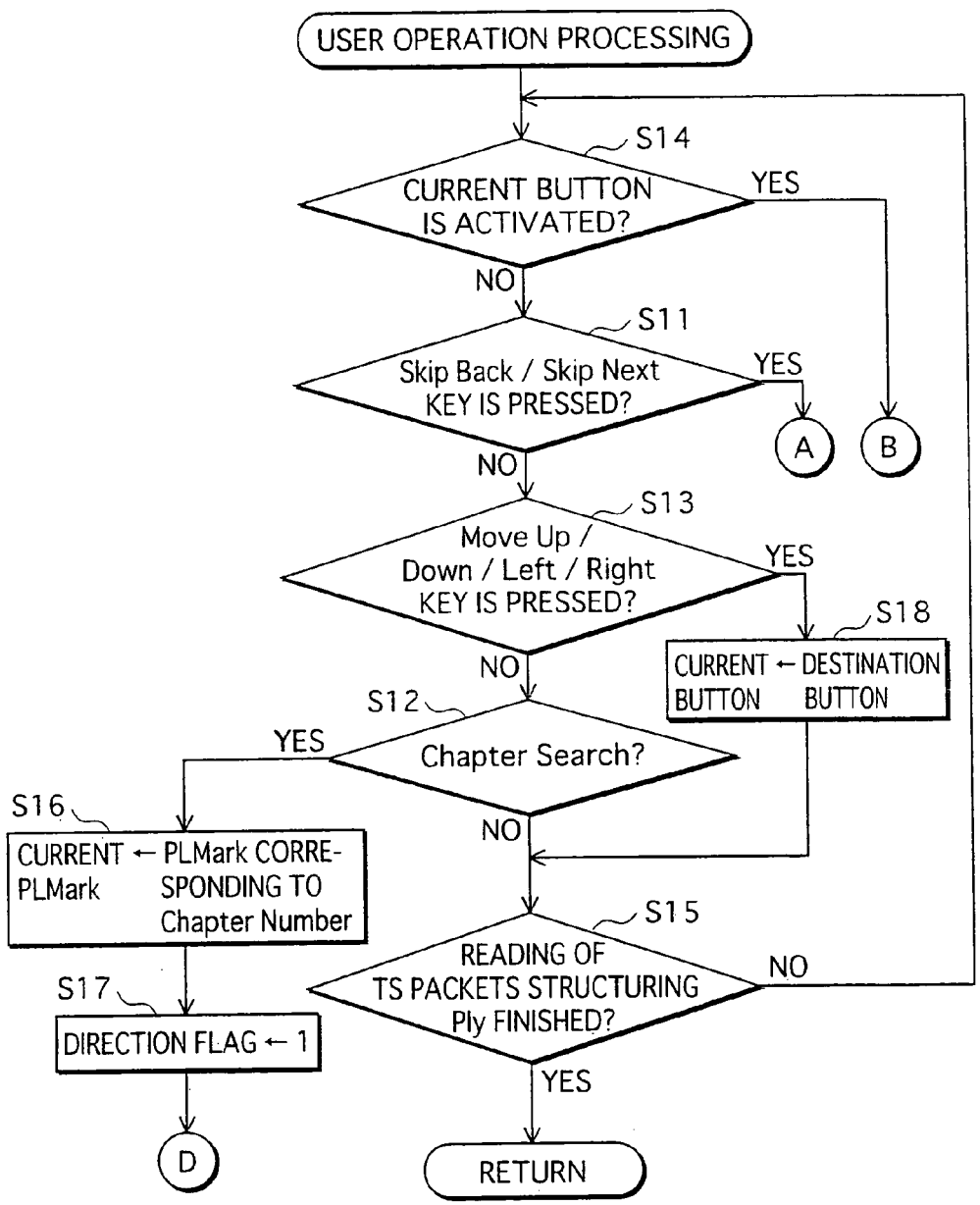
FIG. 24 is a flowchart showing processing procedures at a time of receiving user operation.

Step S5 is processing at the time of receiving user operations, and detailed procedures of this processing are shown in FIG. 24.

FIG. 24 is a flowchart showing processing procedures at the time of receiving user operations. This flowchart includes a loop for repeating processing of Steps S12 to S15 until the judged result of Step S15 becomes "Yes".

Figure 25:
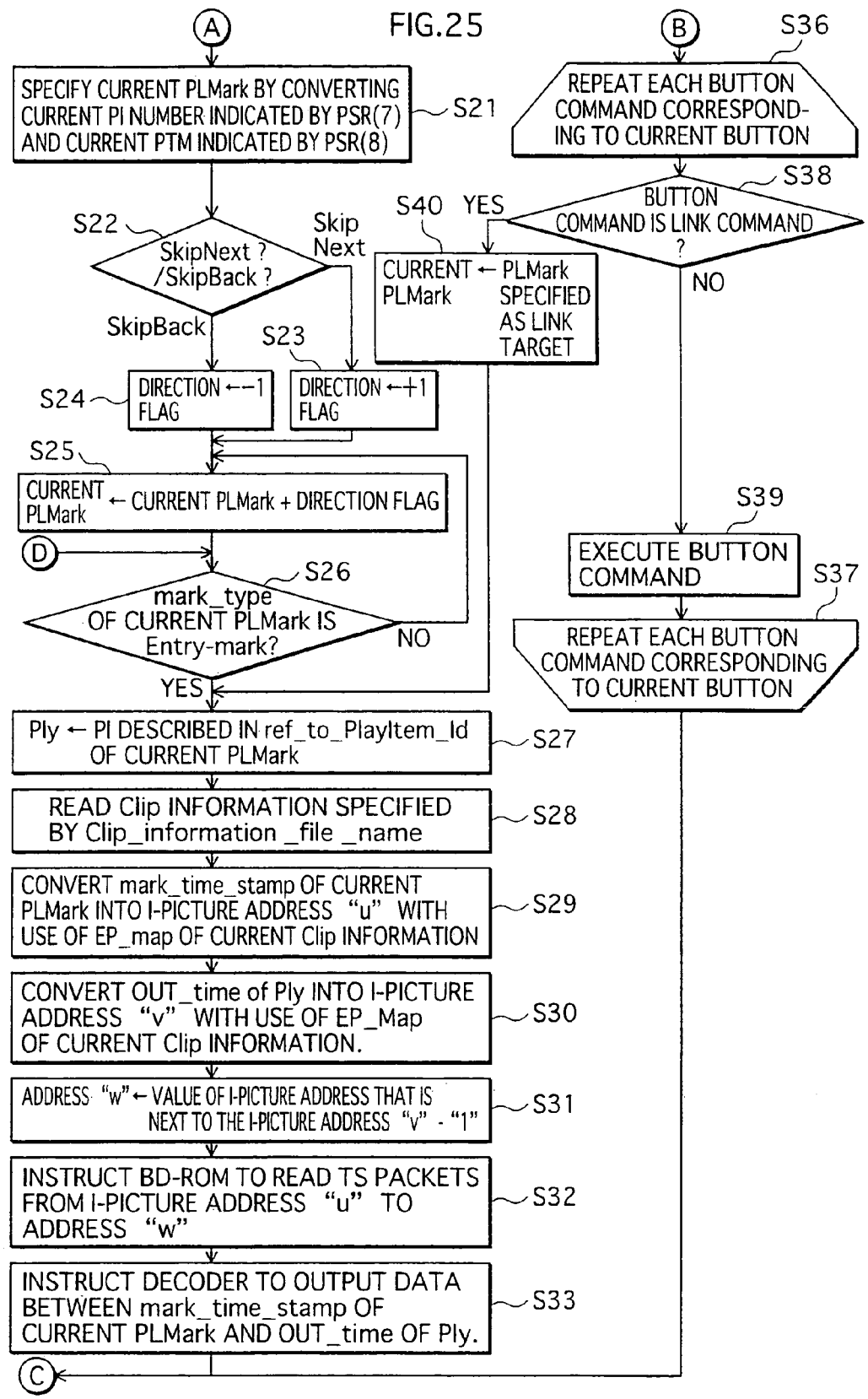
FIG. 25 is a flowchart showing cuing procedures at a time of a user-skip and a Chapter Search.

Step S11 judges whether or not the Skip Next key or the Skip Back key is pressed by the user, and when the judged result is "Yes", the cue-up operation is performed according to the procedures in Steps S21 to S33 in FIG. 25.

Step S21 obtains the current PLMark. The PLMark information is obtained by converting the PI number indicated by PSR(7) and the current PTM indicated by PSR(8), which represent the current playback position on the PL playback time axis. Step S22 is for judging whether the pressed key is the Skip Next key or the Skip Back key. In the case where the key is Skip Next key, the value of a direction flag is set to "+1" in Step S23, and in the case where the key is Skip Back key, the value of the direction flag is set to "-1" in Step S24.

In Step S25, the addition of the number of the current PLMark and the value of the direction flag is set as the number of the current PLMark. In the case where the pressed key is Skip Next key, the value of the direction flag is set to "+1", and therefore the PLMark is incremented. In the case where the pressed key is Skip Back key, the value of the direction flag is set to "-1", and therefore the PLMark is decremented.

Step S26 is a judgment as to whether the mark_type of the current PLMark is Entry-mark, and if not, the control unit 20 returns to Step S25. By repeating the Step S25 again, the current PLMark becomes to indicate the next Mark information. This means that in the case where the cue position indicated by the current Mark information is the Link point, the position indicated by the next Mark information becomes the target cue position.

Steps S27 to S33 show reading procedure and playback procedure based on the current Mark information. The reading range in these Steps is specified by a start address "u" and an end address "w". Step S27 sets the PI indicated in ref_to_PlayItem_Id of the current PLMark to PIy, and step S28 reads Clip information specified by Clip_information_file_name of the PIy. Step S29 converts mark_time_stamp of the current PLMark into I-picture address "u" with use of EP_map of the current Clip information. Meanwhile, Step S30 converts OUT_time of PIy into I-picture address "v" with use of EP_map of the current Clip information. For decoding picture data corresponding to the OUT_time of the PIy, not only I-picture at the address "v", but also picture data following the OUT_time of the PIy is required. This is because the picture data corresponding to OUT_time of PIy might refer to picture data at future time. Therefore, in Step S31, the value of I-picture address that is next to the I-picture address "v" minus "1" is set to the address "w".

After calculating the value of the address "w", in Step S32, the control unit 20 instructs the BD drive 1 to read TS_packets in the range between the I-picture address "u" and the address "w". In Step S33, the control unit 20 instructs the decoder to output data between the mark_time_stamp of current PLMark and the OUT_time of the PIy. Through steps S27 to S33, a portion of the AVClip belonging to the PIy is played.

Step S12 in FIG. 24 is a judgment as to whether the user operation requests the Chapter Search. If Yes, the PL mark corresponding to the Chapter Number inputted by the user is set to the current Mark information in Step S16, the direction flag is set to 1 in step S17, and the processing proceeds to the Step S26 shown in FIG. 25.

Step S13 is a judgment as to whether the MoveUp/Down/Left/Right key is pressed by the user, and if Yes, the destination button indicated in Step S18 is set to the current button, and the processing proceeds to Step S15.

Step S14 is a judgment as to whether the current button is activated, and if Yes, Steps S36 to S40 are to be executed. Steps S36 to S40 form loop processing for repeating each button command corresponding to the current button (Step S36, Step S37)

Step S38 is a judgment as to whether the button commands are Link commands, and if NO, the Link commands are to be executed. If Yes, the Mark information specified as link target is set to the current Mark information, and the processing proceeds to Step S27. By Step S27, the data between the mark_time_stamp of current PLMark in current Mark information and the OUT_time of the PIy are to be outputted.

As described above, in this embodiment, a cue position to which playback can not jump by the user skip, but can jump by the branching commands, is definable by defining attributes in marker information. Accordingly, it becomes possible to define the content at the time of authoring so that the user can not view the answer video no matter how many times the user performs the user skip.

The creator of the contents can allow user to perform the user skip for choosing a material, a question, or the like, and at the same time, the creator can hide the answer from the user. This playback control, which is an improved playback control taking advantage of the AV functions, is of great benefit for the creator.

The Second Embodiment

Figure 26:
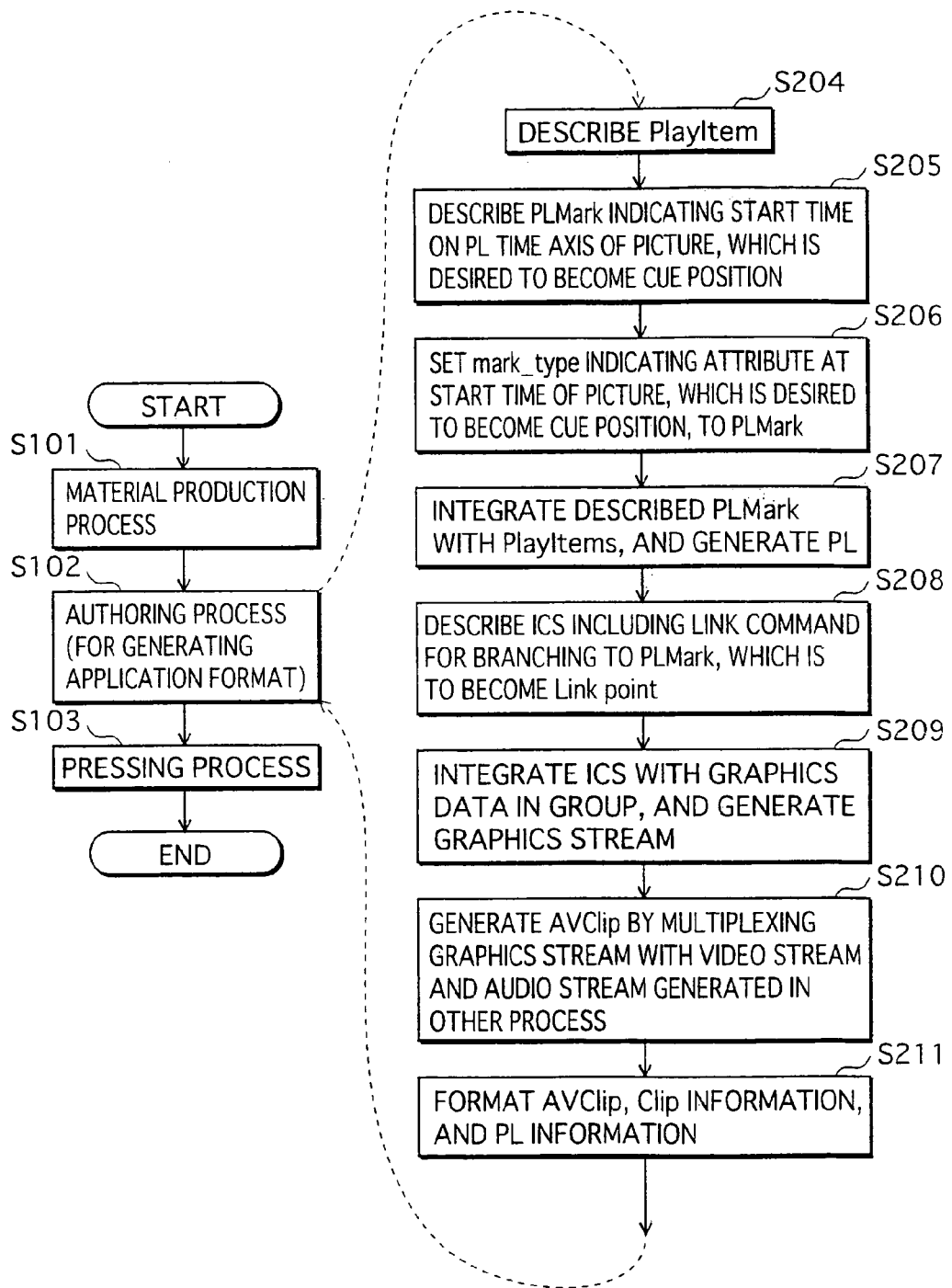
FIG. 26 is a flowchart showing BD-ROM production processes pertaining to the second embodiment.

This embodiment relates to BD-ROM production processes. FIG. 26 is a flowchart showing BD-ROM production processes pertaining to the second embodiment.

The BD-ROM production processes includes a material production process S101 for creating materials such as moving picture records and audio records, an authoring process S102 for generating an application format with use of an authoring device, and a pressing process S103 for creating the BD-ROM master and pressing/laminating to complete the BD-ROM Of these processes, the authoring process S102 targeting the BD-ROM comprises the processes of Steps S204 to S210.

PlayItem is described in Step S204, and a PLMark indicating a start time on the PL time axis of a picture, which is desired to become a cue position, is described in Step S205. In Step S206, the mark_type indicating the attribute at the start time of the picture, which is desired to become a cue position, is set to PLMark. And in Step S207, the described PLMark is integrated with a plurality of PlayItem to generate PL information. In step S208, ICS including Link commands for branching to the PLMark, which is to become Link point, is described.

In step S209, the ICS is integrated with graphics data in a group to generate graphics stream. In step 210, AVClip is obtained by multiplexing the graphics stream generated in Step S209 with video stream and audio stream generated in other process. In Step S211, PL imformation, Clip information, and the obtained AVClip are arranged in BD-ROM format, and there by the application format is completed.

<Remarks>

The above description by no means shows the implementation of all configurations of the present invention. Implementation of the present invention is still possible according to implementation of configurations that carry out the following modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of application.

(A) PL information and Clip information described in the first embodiment are so-called static scenarios. Other than the static scenarios, dynamic scenarios may be recorded on BD-ROM. Dynamic scenarios are command strings showing dynamic playback control procedures relating to AVClips. Dynamic scenarios are command strings showing dynamic playback control procedures relating to AVClips. Dynamic playback control procedures change in response to user operations with respect to a device, and are similar to computer programs in character. Here, dynamic playback controls have two modes. One of the two modes is for playing video data recorded on BD-ROM (normal mode) and the other mode is for enhancing the added value of video data recorded on BD-ROM (enhanced mode) in a playback environment specific to AV devices. In the enhanced mode, the playback control procedures can be described in Java or a page description language.

The playback control procedures may be described so that the branching from the dynamic scenario to a Link point or an Entry-mark in PL is performed. For performing this branching, navigation commands for extensive branching are used. An example of such navigation commands is PlayPLatMark command. This command regards a number specified by an operand as a mark number, and instructs a playback device to perform the cue-up operation with use of Mark information indicated by the mark number.

With use of such a PlayPLatMark command, playback control by which processing branches from a program written in Java or a page description language to the middle of PL can be realized.

(B) In all of the embodiments, an optical disk pertaining to the present invention is implemented as a BD-ROM. However, the optical disk of the present invention is characterized by the recorded graphics stream, and these characteristics are not dependent on the physical properties of a BD-ROM. Any form of recording media is applicable as long as there exists the capacity to record graphics stream. For example, optical disks such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor cards such a compact flash cards, PCM-CIA cards and the like are also applicable, as are (i) magnetic recording disks such as flexible disks, SuperDisk, Zip, Clik! and the like, and (ii) removable hard disk drives such as ORB, Jaz, SparQ, SyJet, EZFley, microdrive and the like. Furthermore, the recording medium may also be a built-in hard disk.

(C) Although the playback devices in all of the embodiments output AVClips recorded on a BD-ROM to a TV after decoding, the playback device may be structured from only a BD-ROM drive, and the TV may be equipped with all of the other elements. In this case, the playback device and the TV can be incorporated into a home network connected using IEEE1394. Also, although the playback devices in the embodiments are of a type used after connecting to a television, integral display-playback devices are also applicable. Furthermore, the playback device may be only system LSI (Integrated Circuit) of the playback devices of the embodiments that perform essential parts of the processing. Because these playback devices are all inventions disclosed in the specification of the present application, acts involving the manufacture of playback devices based on an internal structure of the playback devices shown in the first embodiment are implementations of the inventions disclosed in the specification of the present application. Acts that involve transferring (retail when cost is involved; a gift when no cost is involved), lending, or importing of playback devices shown in the first embodiment are also implementations of the present invention. Acts that involve approaching the general user about transfer, rental or the like by means of show-widow displays, catalogue solicitation, pamphlet distribution and the like are also implementations of these playback devices.

(D) Because of the information processing by computer programs shown in the flowcharts being realized specifically using hardware resources, computer programs showing the processing procedures in the flowcharts form an invention in their own right. Although all of the embodiments show embodiments that relate to the implementation of computer programs pertaining to the present invention in an incorporated form in the playback devices, the computer programs shown in the first embodiment may be implemented in their own right, separate from the playback devices. The implementation of the computer programs in there own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-widow displays, catalogue solicitation, pamphlet distribution, and so forth.

(E) Consider that the element of "time" relating to the steps executed in time-series in the flowcharts is a required item for specifying the invention. If this is the case, then the processing procedures shown by the flowcharts can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(F) When recording on a BD-ROM, extension headers preferably are appended to TS packets constituting AVClips. The extension headers, which are called TP_extra_header, include an "Arrival_Time_Stamp" and a "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback device transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted between all adjacent TS packets. The positioning of isochronous packets is based on times shown in the Arrival_Time_Stamp in each TP_extra_header. Playback device outputs a DTCP_Descriptor following the outputting of the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(G) Although digital streams recorded on a recording medium in the embodiments are AVClips, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, MPEG-AAC format, or a Dts.

(H) Movie works in the embodiments may be obtained by encoding analog video signals broadcast by analog broadcast, or may be stream data constituted from transport streams broadcast by digital broadcast.

Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

(I) The graphics objects shown in the first and second embodiments are raster data coded by run-length coding. The reason why the run-length coding format is adopted as compression/coding format is that the run-length coding format is best suited for compressing/expanding subtitles. Subtitles are characteristic in that the continual length of one pixel value in horizontal direction is comparatively long. Therefore, if using the run-length encoding compression, a high compression rate is obtained. In addition, the load incident to decompression is not much, and so is suitable for creating software for decoding processing. In the present invention, compressing/expanding format used for the subtitles is used for the Graphics Object so that one apparatus structure for performing decoding is shared between the subtitles and the Graphics Objects. However, adopting of run-length encoding method for Graphics Objects is not an indispensable feature of the present invention, and Graphics Objects may alternatively be PNG data. In addition, raster data may be vector data, or transparent images.

(J) In the first embodiment, the mark_type of the PLMark shows whether the PLMark can be linked by any of the Chapter Search, the user-skip, and Link command (Entry-mark), or can be linked only by the Link command (Link point), but other attributes can be set to the mark_type. For instance, a plurality of flags may be set to the PLMark so that each flag show (1) whether the Chapter Search is available, (2) whether the user-skip is available, and (3) whether a link by the Link command is available.

Although the above-described modifications are possible, the technical range of the inventions pertaining to the claims does not extend beyond the technical range recognized by those knowledgeable in the art with respect to resolving technical issues relating to the prior art, because the inventions pertaining to the claims reflect the means for resolving technical issues relating to the prior art. As such, the inventions pertaining to the claims of the present application possess a material correspondence with the disclosures in the detailed description.

INDUSTRIAL APPLICABILITY

Recording media and playback devices pertaining to the present invention are capable of imparting interactive controls on movie works, thus making it possible to supply the market with movie works having high added value and to invigorate the markets for movies, consumer appliances, and the like. As such, recording media and playback devices pertaining to the present invention are highly applicable in the movie and consumer appliance industries.

The invention claimed is:

1. A recording medium comprising a digital stream and playlist information,
    the playlist information including at least one piece of playback section information and playlist mark information,
    each piece of the playback section information including a pair of an in-time and an out-time and defining therewith a playback section on a playback timeline of the digital stream,
    the playlist mark information including an identifier of at least one playback section, time information and attribute information, the time information indicating, as a cue-up position, a time point between the in-time and the out-time of each playback section,
    the digital stream including a video stream and a graphics stream,
    the graphics stream including at least one interactive control segment, and an object definition segment defining the graphics object,
    the interactive control segment including at least one piece of button information, each piece of the button information realizing an interactive screen by displaying a graphics object as a button material in a given state and including a button command to be executed by a playback device when a confirmation operation is made on the button material,
    the button command being a link command for instructing the playback device to change a playback start position, the link command being in an indirect reference format and indicating a playback start position by indicating a piece of playlist mark information,
    the attribute information showing whether a cue-up position indicated by a piece of playlist mark information is a link point designated with a link command or an entry mark, and when a user inputs an operation intended to select a playback position, the playback device referring to a cue-up position that is an entry mark but ignoring a cue-up position that is a link point.

2. The recording medium of claim 1, wherein the operation input by the user is one of operations including at least a skip operation and a chapter search operation, the skip operation for selecting a playback start position before or after a current playback position and a chapter search operation for selecting a playback start position to be a chapter.

3. A playback device that controls playback of a digital stream based on playback section information included in playlist information recorded on a recording medium,
    the playlist information including at least one piece of playback section information and playlist mark information,
    each piece of the playback section information including a pair of an in-time and an out-time and defining therewith a playback section on a playback timeline of the digital stream,
    the playlist mark information including an identifier of at least one playback section, time information and attribute information, the time information indicating, as a cue-up position, a time point between the in-time and the out-time of each playback section,
    the digital stream including a video stream and a graphics stream,
    the graphics stream including at least one interactive control segment, and an object definition segment defining the graphics object,
    the interactive control segment including at least one piece of button information, each piece of the button information realizing an interactive screen by displaying a graphics object as a button material in a given state and including a button command to be executed by a playback device when a confirmation operation is made on the button material,
    the button command being a link command for instructing the playback device to change a playback start position, the link command being in an indirect reference format and indicating a playback start position by indicating a piece of playlist mark information,
    the attribute information showing whether a cue-up position indicated by a piece of playlist mark information is a link point designated with a link command or an entry mark,
    the playback device comprising:
    a reading unit operable to read, one by one, sections of the digital stream recorded on the recording medium;
    a playback unit operable to play back a read section of the digital stream;
    a state register operable to record, among playback sections defined by the playback section information, as a current playback section, a playback section to be played back; and
    a control unit operable to control the reading unit to perform a cue-up operation, wherein
    the cue-up operation performed by the control unit is one of operations that include at least
    an operation that is performed when a user inputs an operation intended to select a playback position, to ignore a position specified by the playlist mark information as a link point and converting time information of a position specified by the playlist mark information as an entry mark into an address in the digital stream, and an operation that is performed when the control unit decodes a link command, to convert time information of a position specified by the playlist mark information as an entry mark or a link point into an address in the digital stream.

4. The playback device of claim 3, wherein the operation input by the user is an input of a chapter number to be searched for, when a piece of playlist mark information corresponding to the chapter number has an attribute of an entry mark, the control unit performs the cue-up operation by specifying as the cue-up position a point to be cued up as indicated by the piece of playlist mark information, and converting time information of the point into the address in the digital stream, and when the piece of playlist mark information corresponding to the chapter number has an attribute of a link point, the control unit performs the cue-up operation by specifying as the cue-up position a point that is to be cued up as indicated by the next piece of playlist mark information and has an attribute of an entry mark, and converting time information of the point into the address in the digital stream.

5. The playback device of claim 3, wherein the operation input by the user is an input of a skipping direction, when a piece of playlist mark information corresponding to the next or the previous point of a current playback point has an attribute of an entry mark, the control unit performs the cue-up operation by specifying as the cue-up position a point to be cued up as indicated by the piece of playlist mark information, and converting time information of the point into the address in the digital stream, and when the piece of playlist mark information corresponding to the next or the previous point of the current playback point has an attribute of a link point, the control unit performs the cue-up operation by specifying as the cue-up position a point that is to be cued up as indicated by the next or the previous piece of playlist mark information and has an attribute of an entry mark, and converting time information of the point into the address in the digital stream.

6. A recording method for recording onto a recording medium, the recording method comprising:

creating application data; and recording the application data onto the recording medium, the application data including a digital stream and playlist information, the playlist information including at least one piece of playback section information and playlist mark information, each piece of the playback section information including a pair of an in-time and an out-time and defining therewith a playback section on a playback timeline of the digital stream, the playlist mark information including an identifier of at least one playback section, time information and attribute information, the time information indicating, as a cue-up position, a time point between the in-time and the out-time of each playback section, the digital stream including a video stream and a graphics stream, the graphics stream including at least one interactive control segment, and an object definition segment defining the graphics object, the interactive control segment including at least one piece of button information, each piece of the button information realizing an interactive screen by displaying a graphics object as a button material in a given state and including a button command to be executed by a playback device when a confirmation operation is made on the button material, the button command being a link command for instructing the playback device to change a playback start position, the link command being in an indirect reference format and indicating a playback start position by indicating a piece of playlist mark information, the attribute information showing whether a cue-up position indicated by a piece of playlist mark information is a link point designated with a link command or an entry mark, and when a user inputs an operation intended to select a playback position, the playback device referring to a cue-up position that is an entry mark but ignoring a cue-up position that is a link point.

7. A computer program recorded on a computer readable medium for enabling a computer to perform playback control of a digital stream based on playback section information included in playlist information, the playlist information including at least one piece of playback section information and playlist mark information, each piece of the playback section information including a pair of an in-time and an out-time and defining therewith a playback section on a playback timeline of the digital stream, the playlist mark information including an identifier of at least one playback section, time information and attribute information, the time information indicating, as a cue-up position, a time point between the in-time and the out-time of each playback section, the digital stream including a video stream and a graphics stream, the graphics stream including at least one interactive control segment, and an object definition segment defining the graphics object, the interactive control segment including at least one piece of button information, each piece of the button information realizing an interactive screen by displaying a graphics object as a button material in a given state and including a button command to be executed by a playback device when a confirmation operation is made on the button material, the button command being a link command for instructing the playback device to change a playback start position, the link command being in an indirect reference format and indicating a playback start position by indicating a piece of playlist mark information, the attribute information showing whether a cue-up position indicated by a piece of playlist mark information is a link point designated with a link command or an entry mark, among playback sections defined by the playback section information, a playback section to be played back being recorded as a current playback section, the computer program enabling the computer to perform:

reading, one by one, sections of the digital stream recorded on a recording medium;

playing back a read section of the digital stream;

controlling the reading, wherein a cue-up operation performed by the controlling is one of operations that include at least an operation that is performed when a user inputs an operation intended to select a playback position, to ignore a position specified by the playlist mark information as a link point and converting time information of a position specified by the playlist mark information as an entry mark into an address in the digital stream, and an operation that is performed when the controlling decodes a link command, to convert time information of a position specified by the playlist mark information as an entry mark or a link point into an address in the digital stream.

8. A playback method for executing a playback control of a digital stream based on playback section information included in playlist information, the playlist information including at least one piece of playback section information and playlist mark information, each piece of the playback section information including a pair of an in-time and an out-time and defining therewith a playback section on a playback timeline of the digital stream, the playlist mark information including an identifier of at least one playback section, time information and attribute information, the time information indicating, as a cue-up position, a time point between the in-time and the out-time of each playback section, the digital stream including a video stream and a graphics stream, the graphics stream including at least one interactive control segment, and an object definition segment defining the graphics object, the interactive control segment including at least one piece of button information, each piece of the button information realizing an interactive screen by displaying a graphics object as a button material in a given state and including a button command to be executed by a playback device when a confirmation operation is made on the button material, the button command being a link command for instructing the playback device to change a playback start position, the link command being in an indirect reference format and indicating a playback start position by indicating a piece of playlist mark information, the attribute information showing whether a cue-up position indicated by a piece of playlist mark information is a link point designated with a link command or an entry mark, among playback sections defined by the playback section information, a playback section to be played back being recorded as a current playback section, the playback method comprising:

reading, one by one, sections of the digital stream recorded on a recording medium;

playing back a read section of the digital stream;

controlling the reading, wherein a cue-up operation performed by the controlling is one of operations that include at least an operation that is performed when a user inputs an operation intended to select a playback position, to ignore a position specified by the playlist mark information as a link point and converting time information of a position specified by the playlist mark information as an entry mark into an address in the digital stream, and an operation that is performed when the controlling decodes a link command, to convert time information of a position specified by the playlist mark information as an entry mark or a link point into an address in the digital stream.

* * * * *

UNITED STATES PATENT AND TRADEMARK OFFICE
CERTIFICATE OF CORRECTION

PATENT NO.       : 7,660,511 B2
APPLICATION NO.  : 10/554147
DATED            : February 9, 2010
INVENTOR(S)      : Ikeda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this

Thirtieth Day of November, 2010

David J. Kappos
*Director of the United States Patent and Trademark Office*